(12) United States Patent
Zhang et al.

(10) Patent No.: US 11,791,884 B2
(45) Date of Patent: Oct. 17, 2023

(54) BEAM PAIR SELECTION USING UPLINK AND DOWNLINK MEASUREMENTS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/302,517

(22) Filed: May 5, 2021

(65) Prior Publication Data

US 2021/0351832 A1 Nov. 11, 2021

Related U.S. Application Data

(60) Provisional application No. 63/021,425, filed on May 7, 2020.

(51) Int. Cl.
*H04B 7/06* (2006.01)
*H04W 24/10* (2009.01)
(Continued)

(52) U.S. Cl.
CPC ......... *H04B 7/0695* (2013.01); *H04B 17/336* (2015.01); *H04L 5/1461* (2013.01); *H04W 24/10* (2013.01)

(58) Field of Classification Search
CPC ... H04B 7/0695; H04B 17/336; H04L 5/1461; H04W 24/10
See application file for complete search history.

(56) References Cited

U.S. PATENT DOCUMENTS

2018/0083679 A1* 3/2018 Lim ................. H04B 17/336
2019/0260485 A1* 8/2019 Byun ............... H04B 17/336
(Continued)

FOREIGN PATENT DOCUMENTS

WO WO-2019164363 A1 * 8/2019
WO WO-2020222458 A1 * 11/2020 ............. H04B 1/525
WO WO-2021172903 A1 * 9/2021

OTHER PUBLICATIONS

Measurement-driven Evaluation of All-digital Many-antenna Full-duplex Communication; Evan Everett, Clayton Shepard, Lin Zhong, and Ashutosh Sabharwal; Aug. 15, 2015; Research Gate (Year: 2015).*

(Continued)

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment (UE) may perform, in a full duplex communication mode, a channel measurement (CM) procedure associated with a self-interference measurement (SIM) procedure to determine a downlink signal to self-interference plus noise ratio associated with a downlink (DL) and uplink (UL) (DL/UL) beam pair of the UE; receive, from a base station, uplink interference information associated with a UL beam of the DL/UL beam pair of the UE, wherein the uplink interference information indicates at least one of: a final DL/UL beam pair selected by the base station; and transmit a measurement report based at least in part on the CM procedure and the SIM procedure, wherein the measurement report is based at least in part on the downlink signal to self-interference plus noise ratio. Numerous other aspects are provided.

30 Claims, 13 Drawing Sheets

(51) Int. Cl.
*H04B 17/336* (2015.01)
*H04L 5/14* (2006.01)

(56) References Cited

U.S. PATENT DOCUMENTS

2021/0351838 A1* 11/2021 Zhang .................. H04B 7/0695
2021/0352510 A1* 11/2021 Zhang .................... H04L 1/189
2021/0376894 A1* 12/2021 Cha ........................ H04B 7/063
2022/0014298 A1* 1/2022 Ibrahim ............... H04B 17/309

OTHER PUBLICATIONS

International Search Report and Written Opinion—PCT/US2021/031065—ISA/EPO—dated Sep. 25, 2021.
Nokia., et al., "UL SRS Design Considerations in NR", 3GPP TSG-RAN WG1 NR AH#2, 3GPP Draft; R1-1711310, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), 6 Pages, XP051300504, Retrieved from the Internet: URL: http://www.3gpp.org/ftp/Meetings_3GPP_SYNC/RAN1/Docs/[retrieved on Jun. 26, 2017], p. 5.
Partial International Search Report—PCT/US2021/031065—ISA/EPO—dated Aug. 6, 2021.

\* cited by examiner

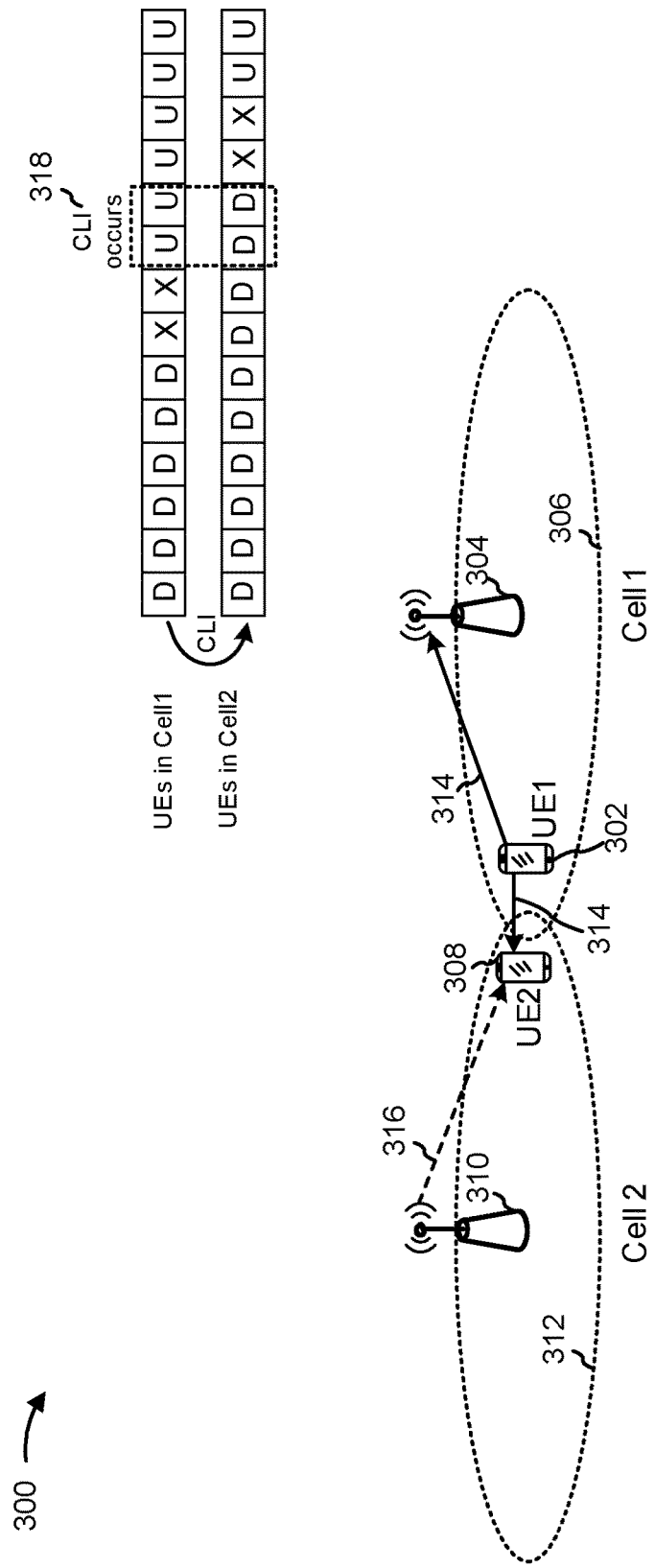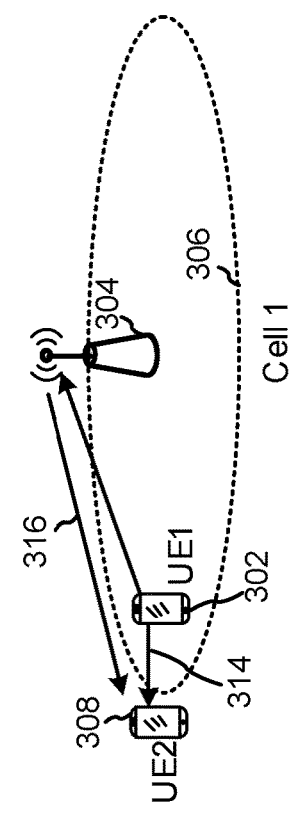

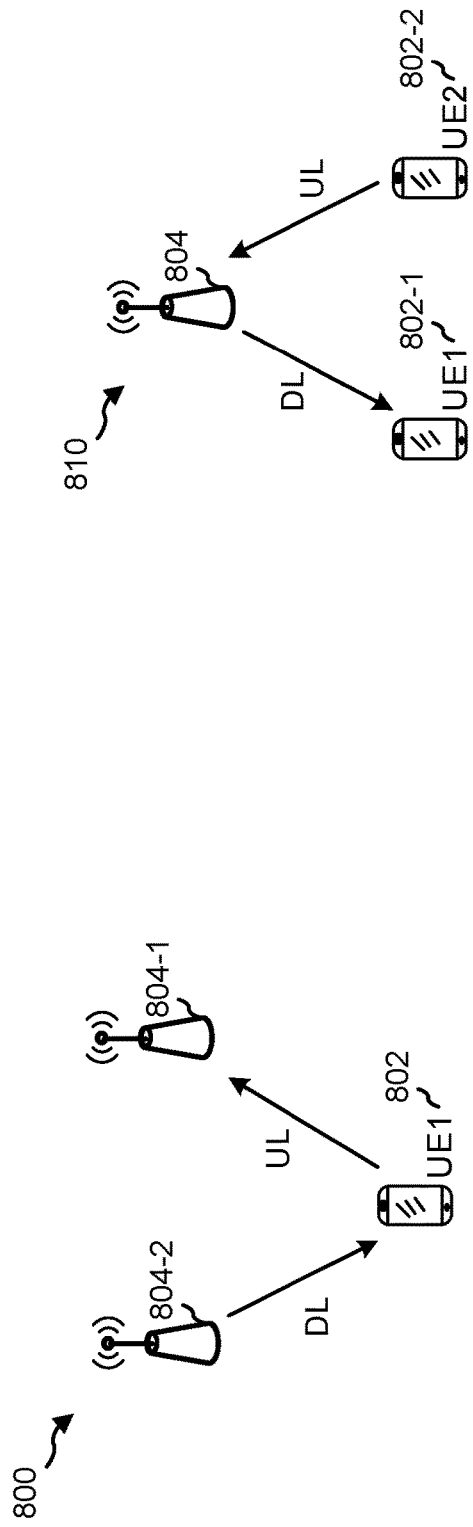
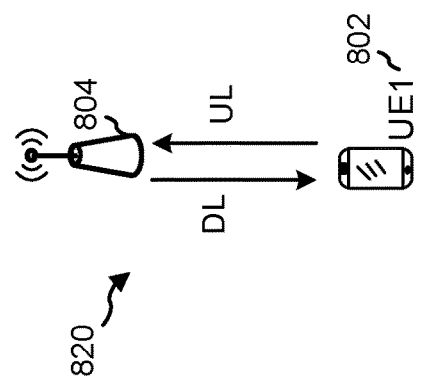
FIG. 8B
FIG. 8C
FIG. 8A

BEAM PAIR SELECTION USING UPLINK AND DOWNLINK MEASUREMENTS

CROSS-REFERENCE TO RELATED APPLICATION

This Patent application claims priority to U.S. Provisional Patent Application No. 63/021,425, filed on May 7, 2020, entitled "BEAM PAIR SELECTION USING UPLINK AND DOWNLINK MEASUREMENTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam pair selection using uplink and downlink measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

Full-duplex (FD) communication refers to contemporaneous uplink and downlink communication by a single device using the same resources. FD communication may provide a reduction in latency, enhance spectral efficiency per cell or per UE, and allow for a more efficient utilization of resources.

SUMMARY

In some aspects, a method of wireless communication, performed by a user equipment, may include performing, in a full duplex communication mode, a channel measurement (CM) procedure associated with a self-interference measurement (SIM) procedure to determine a downlink signal to self-interference plus noise ratio associated with a downlink (DL) and uplink (UL) (DL/UL) beam pair of the UE; receiving, from a base station, uplink interference information associated with a UL beam of the DL/UL beam pair of the UE, wherein the uplink interference information indicates at least one of: a final DL/UL beam pair selected by the base station; and transmitting a measurement report based at least in part on the CM procedure and the SIM procedure, wherein the measurement report is based at least in part on the downlink signal to self-interference plus noise ratio, wherein, if the uplink interference information indicates the uplink interference measurement, the measurement report is based at least in part on the uplink interference information, and wherein, if the uplink interference information indicates the final DL/UL beam pair, the uplink interference information is received after the measurement report is transmitted.

In some aspects, a method of wireless communication, performed by a base station, may include determining, for an uplink beam of a DL/UL beam pair of a UE associated with a full duplex communication mode, an uplink interference measurement associated with a CM procedure and a SIM procedure of the UE; and transmitting, to the UE, uplink interference information, wherein the uplink interference information indicates at least one of: a final DL/UL beam pair selected by the base station based at least in part on the uplink interference measurement and a downlink signal to self-interference plus noise ratio provided by the UE.

In some aspects, a user equipment for wireless communication may include a memory and one or more processors coupled to the memory. The one or more processors may be configured to perform, in a full duplex communication mode, a CM procedure associated with a SIM procedure to determine a downlink signal to self-interference plus noise ratio associated with a DL/UL beam pair of the UE; receive, from a base station, uplink interference information associated with a UL beam of the DL/UL beam pair of the UE, wherein the uplink interference information indicates at least one of: an uplink interference measurement determined by the base station, or a final DL/UL beam pair selected by the base station; and transmit a measurement report based at least in part on the CM procedure and the SIM procedure, wherein the measurement report is based at least in part on the downlink signal to self-interference plus noise ratio, wherein, if the uplink interference information indicates the uplink interference measurement, the measurement report is based at least in part on the uplink interference information, and wherein, if the uplink interference information indicates the final DL/UL beam pair, the uplink interference information is received after the measurement report is transmitted.

In some aspects, a base station for wireless communication may include a memory and one or more processors coupled to the memory. The one or more processors may be configured to determine, for an uplink beam of a DL/UL beam pair of a UE associated with a full duplex communication mode, an uplink interference measurement associated with a CM procedure and a SIM procedure of the UE; and transmit, to the UE, uplink interference information, wherein the uplink interference information indicates at least one of: the uplink interference measurement, or a final DL/UL beam pair selected by the base station based at least in part on the uplink interference measurement and a downlink signal to self-interference plus noise ratio provided by the UE.

In some aspects, a non-transitory computer-readable medium may store one or more instructions for wireless communication. The one or more instructions, when executed by one or more processors of a UE, may cause the one or more processors to perform, in a full duplex communication mode, a CM procedure associated with a SIM procedure to determine a downlink signal to self-interference plus noise ratio associated with a DL/UL beam pair of the UE; receive, from a base station, uplink interference information associated with a UL beam of the DL/UL beam pair of the UE, wherein the uplink interference information indicates at least one of: an uplink interference measurement determined by the base station, or a final DL/UL beam pair selected by the base station; and transmit a measurement report based at least in part on the CM procedure and the SIM procedure, wherein the measurement report is based at least in part on the downlink signal to self-interference plus noise ratio, wherein, if the uplink interference information indicates the uplink interference measurement, the measurement report is based at least in part on the uplink interference information, and wherein, if the uplink interference information indicates the final DL/UL beam pair, the uplink interference information is received after the measurement report is transmitted.

In some aspects, a non-transitory computer-readable medium may store one or more instructions for wireless communication. The one or more instructions, when executed by one or more processors of a base station, may cause the one or more processors to determine, for an uplink beam of a DL/UL beam pair of a UE associated with a full duplex communication mode, an uplink interference measurement associated with a CM procedure and a SIM procedure of the UE; and transmit, to the UE, uplink interference information, wherein the uplink interference information indicates at least one of: the uplink interference measurement, or a final DL/UL beam pair selected by the base station based at least in part on the uplink interference measurement and a downlink signal to self-interference plus noise ratio provided by the UE.

In some aspects, an apparatus for wireless communication may include means for performing, in a full duplex communication mode, a CM procedure associated with a SIM procedure to determine a downlink signal to self-interference plus noise ratio associated with a DL/UL beam pair of the apparatus; means for receiving, from a base station, uplink interference information associated with a UL beam of the DL/UL beam pair of the apparatus, wherein the uplink interference information indicates at least one of: an uplink interference measurement determined by the base station, or a final DL/UL beam pair selected by the base station; and means for transmitting a measurement report based at least in part on the CM procedure and the SIM procedure, wherein the measurement report is based at least in part on the downlink signal to self-interference plus noise ratio, wherein, if the uplink interference information indicates the uplink interference measurement, the measurement report is based at least in part on the uplink interference information, and wherein, if the uplink interference information indicates the final DL/UL beam pair, the uplink interference information is received after the measurement report is transmitted.

In some aspects, an apparatus for wireless communication may include means for determining, for an uplink beam of a DL/UL beam pair of a UE associated with a full duplex communication mode, an uplink interference measurement associated with a CM procedure and a SIM procedure of the UE; and means for transmitting, to the UE, uplink interference information, wherein the uplink interference information indicates at least one of: the uplink interference measurement, or a final DL/UL beam pair selected by the apparatus based at least in part on the uplink interference measurement and a downlink signal to self-interference plus noise ratio provided by the UE.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3A is a diagram illustrating a wireless network operating in a semi-static time division duplexing (TDD) configuration, in accordance with the present disclosure.

FIG. 3B is a diagram illustrating a wireless network operating in dynamic TDD configuration, in accordance with the present disclosure.

FIGS. 8A-8C are diagrams illustrating examples of full duplex (FD) communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
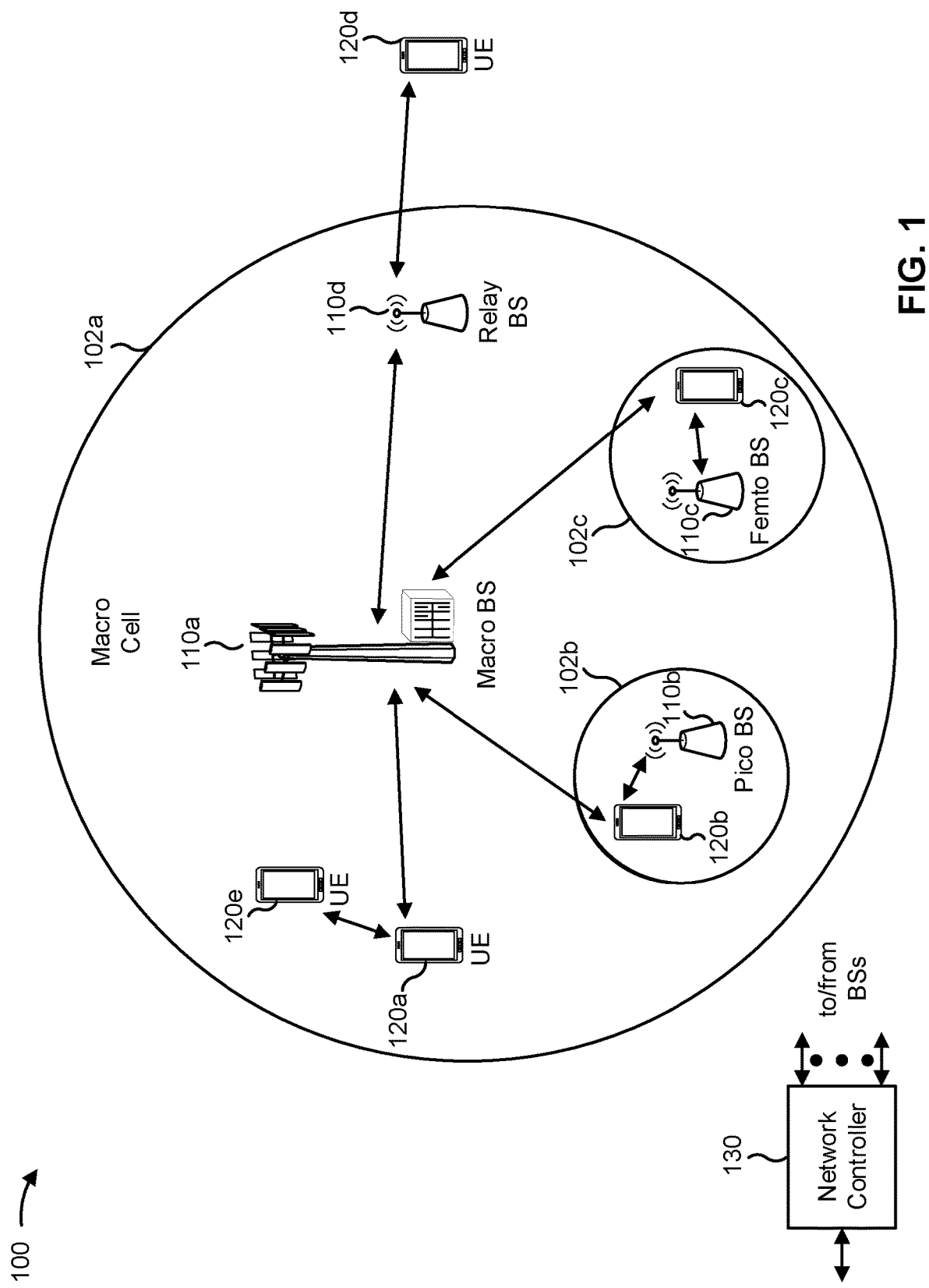
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
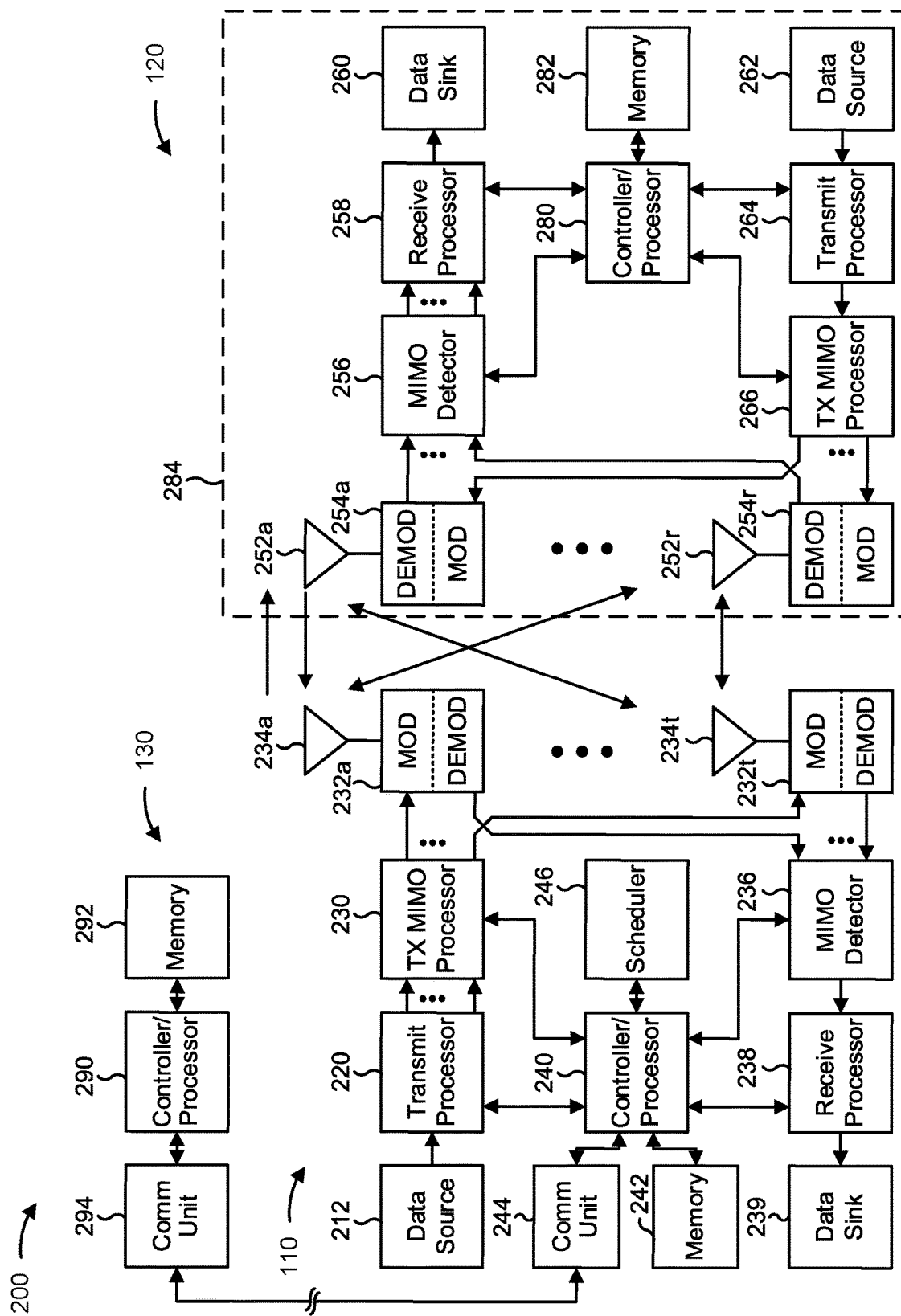
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-13.

Controller/processor 240 of base station 110, controller/processor 280 of UE 120, and/or any other component(s) of FIG. 2 may perform one or more techniques associated with beam pair selection using uplink and downlink measurement, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, UE 120 may include means for performing, in a full duplex communication mode, a channel measurement (CM) procedure associated with a self-interference measurement (SIM) procedure to determine a downlink signal to self-interference plus noise ratio associated with a downlink (DL) and uplink (UL) (DL/UL) beam pair of the UE; means for receiving, from a base station, uplink interference information associated with a UL beam of the DL/UL beam pair of the UE; means for transmitting a measurement report based at least in part on the CM procedure and the SIM procedure, wherein the measurement report is based at least in part on the downlink signal to self-interference plus noise ratio; means for determining an uplink signal to interference plus noise ratio based at least in part on the interference level, wherein the measurement report is based at least in part on the uplink signal to interference plus noise ratio; means for selecting the one or more selected DL/UL beam pairs from a plurality of DL/UL beam pairs based at least in part on one or more selected CMs and SIMs associated with the one or more selected DL/UL beam pairs; means for receiving configuration information associated with CM and SIM measurement resources for a set of DL/UL beam pairs, wherein the set of DL/UL beam pairs are selected based at least in part on the uplink interference information; means for determining one or more selected DL/UL beam pairs based at least in part on the uplink interference information; means for reporting the one or more selected DL/UL beam pairs; means for receiving the uplink interference information indicating the final DL/UL beam pair selected by the base station; means for communicating with the base station using the final DL/UL beam pair in the full duplex communication mode; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining, for an uplink beam of a DL/UL beam pair of a UE associated with a full duplex communication mode, an uplink interference measurement associated with a CM procedure and a SIM procedure of the UE; means for transmitting, to the UE, uplink interference information; means for receiving a measurement report based at least in part on the CM procedure and the SIM procedure; means for receiving information indicating a transmit power of the UE; means for transmitting configuration information associated with interference measurement resources for one or more selected DL/UL beam pairs; means for receiving the downlink signal to self-interference plus noise ratio from the UE prior to transmitting the uplink interference information; means for receiving a measurement report indicating one or more selected DL/UL beam pairs based at least in part on the uplink interference information; means for transmitting the uplink interference information indicating the final DL/UL beam pair; means for selecting the final DL/UL beam pair based at least in part on the uplink interference measurement; means for communicating with the UE using the final DL/UL beam pair; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3A is a diagram illustrating a wireless network 300 operating in a semi-static time division duplexing (TDD) configuration. FIG. 3B is a diagram illustrating a wireless network 320 operating in dynamic TDD configuration. Dynamic TDD may enhance spectrum efficiency of wireless communication networks and provide a higher throughput by dynamically altering UL or DL transmission direction, such as by designating slots as UL slots or DL slots. A UL slot is a slot for uplink communication, such as a slot configured with at least a threshold number of UL symbols. A DL slot is a slot for downlink communication, such as a slot configured with at least a threshold number of DL symbols. A TDD UL-DL slot format for a UE indicates which slots are UL slots and which slots are DL slots.

If nearby UEs have different TDD UL-DL slot formats, one UE (e.g., UE2 308, which may be UE 120) may be a victim and may receive UL transmission from another UE (e.g., UE1 302, which may be UE 120) known as an aggressor. The received UL transmission from the UE1 302 is known as cross link interference (CLI). CLI occurs when a UL symbol (e.g., an interfering symbol) of an aggressor collides with a DL symbol (e.g., an interfered symbol) of a victim. CLI may be caused by an UL transmission from the aggressor UE (e.g., UE1 302). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 3A, UE1 302 is within Cell1 306 and is being served by base station 304 (e.g., base station 110), while UE2 308 is within Cell2 312 and is being served by base station 310 (e.g., base station 110). CLI may occur between UEs at the cell edges of nearby cells, as UEs at cell edges of nearby cells may be in close proximity to each other. As shown in FIG. 3A, UE1 302 and UE2 308 are at their respective cell edges and may be communicating with their respective base stations. UE1 302 may send an UL transmission 314 to base station 304, while UE2 308 is receiving a DL transmission 316 from base station 310. However, in certain instances, the UL transmission 314 sent by UE1 302 to base station 304 may also be received by UE2 308 while receiving the DL transmission 316 from base station 310. The UL transmission 314 from UE1 302 received by UE2 308 causes CLI and may interfere with the DL transmission 316 UE2 308 receives from base station 310. As such, one or more UL symbols of the UL transmission 314 may collide with one or more DL symbols of the DL transmission 316. In the example of FIG. 3A, two UL symbols of the UL transmission 314 overlap or collide with two DL symbols of the DL transmission 316, such that CLI occurs at the overlap 318.

In the example of FIG. 3B, both UE1 302 and UE2 308 are being served by the same cell (e.g., cell1 306). Both UE 1 302 and UE2 308 are near the cell edge, and in some instances, the UL transmission 314 sent by UE1 302 to base station 304 may also be received by UE2 308 while receiving the DL transmission 316 from base station 304. The UL transmission 314 from UE1 302 received by UE2 may cause CLI and may interfere with the DL transmission 316 received by UE2 308 from the base station 304. As such, one or more UL symbols of the UL transmission 314 may collide with one or more DL symbols of the DL transmission 316.

CLI measurements metrics include, for example, sounding reference signal reference signal received power (SRS-RSRP) and CLI-received signal strength indicator (CLI-RSSI). SRS-RSRP may include the linear average of the power contributions of the sounding reference signal (SRS) to be measured over the configured resource elements within the considered measurement frequency bandwidth in the time resources in the configured measurement occasions. CLI-RSSI may include the linear average of the total received power observed only in certain OFDM symbols of measurement time resource(s), in the measurement bandwidth, over the configured resource elements for measurement by the UE. For both SRS-RSRP and CLI-RSSI measurement reports, both events may be triggered and periodic reporting is supported. Layer3 (L3) filtering may be applied, such that for CLI-RSSI measurements, the implementation of the UE may determine whether to reset filtering upon a bandwidth part (BWP) switch. A dedicated measurement gap may not be needed.

As indicated above, FIGS. 3A and 3B are provided as one or more examples. Other examples may differ from what is described with regard to FIGS. 3A and 3B.

Figure 4:
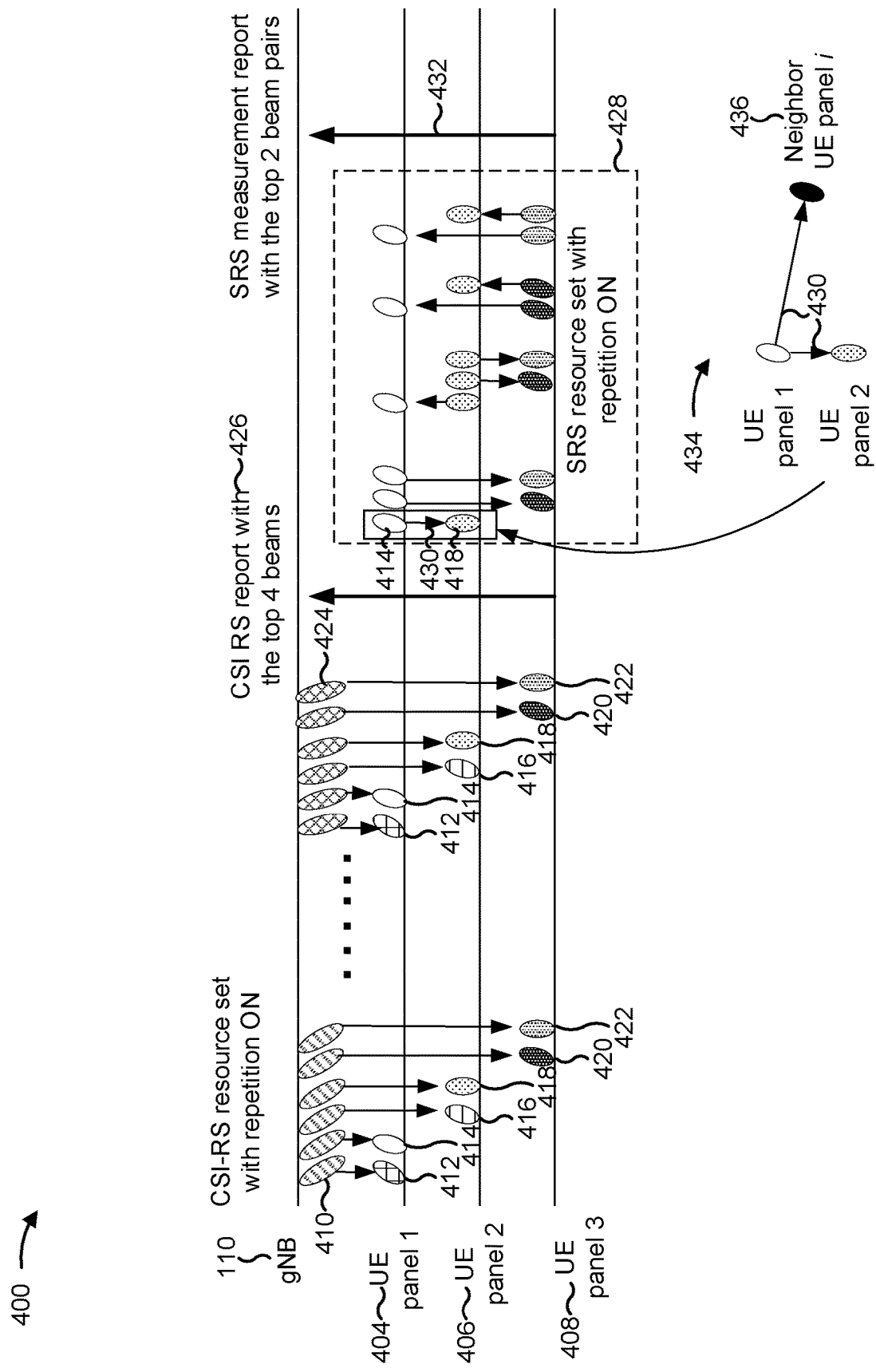
FIG. 4 is a diagram illustrating an example of self-interference measurement based at least in part on a channel state information reference signal (CSI-RS) measurement for beam management, in accordance with the present disclosure.

FIG. 4 is a diagram illustrating an example 400 of self-interference measurement based at least in part on a channel state information reference signals (CSI-RS) measurement for beam management. Example 400 involves a base station 110 (shown as a gNB), and a UE comprising multiple UE panels (e.g., UE panels 1, 2, and 3, shown by reference numbers 404, 406, and 408, respectively). Generally, beams are represented by ovals in FIG. 4. An oval with a given fill represents a beam, and two or more ovals with the same fill, at different locations in FIG. 4, may represent the same receive beam or transmit beam at different times. For example, reference number 410 shows a set of CSI-RSs that are transmitted by the base station 110 on a first beam in a CSI-RS resource set with repetition. The UE may measure the CSI-RSs using respective receive beams 412, 414, 416, 418, 420, 422. Reference number 424 shows a set of CSI-RSs that are transmitted by the base station 110 on a second beam in a CSI-RS resource set with repetition. Again, the UE may measure the CSI-RSs using the respective receive beams 412, 414, 416, 418, 420, 422.

As shown by reference number 426, the UE may transmit a CSI-RS report to the base station 110. The CSI-RS report may indicate a top N beams, determined based at least in part on the measurements performed using the receive beams 412 through 422. In example 400, N is 4, though N is up to 4 in the current spec. The top N beams may be selected based at least in part on one or more metrics, described elsewhere herein. Here, the 4 CSI-RS beams associated with the 4 Rx beams 414, 418, 420, and 422, are selected (not shown).

Reference number 428 shows the determination of self-interference measurements by the UE 120 based at least in part on the selected beams. An arrow from a first beam to a second beam may indicate that the first beam transmits a reference signal that is measured using the second beam to determine a self-interference measurement. For example, the arrow shown by reference number 430 indicates the transmission of a SRS using the beam 414 that is measured using the beam 418 to determine a self-interference measurement for this Tx and Rx beam pair. The SRSs may be associated with an SRS resource set with repetition configured. In example 400, each pairing of transmit and receive beams from beams 414, 418, 420, and 422 are measured with the exception of the beam pairs formed by beams 420 and 422, since beams 420 and 422 are associated with the same panel. As shown by reference number 432, the UE may transmit an SRS measurement report indicating a top 2 beam pairs based at least in part on the self-interference measurements determined in connection with reference number 428.

As shown by reference number 434, in some aspects, a UE may determine a CLI measurement based at least in part on a reference signal associated with a self-interference measurement. For example, the same SRS transmission used to measure self-interference from beam 414 to beam 418 may be used by a neighbor UE to measure CLI at a panel i of the neighbor UE, as shown by reference number 436.

As indicated above, FIG. 4 is provided as an example. Other examples may differ from what is described with regard to FIG. 4.

Figure 5:
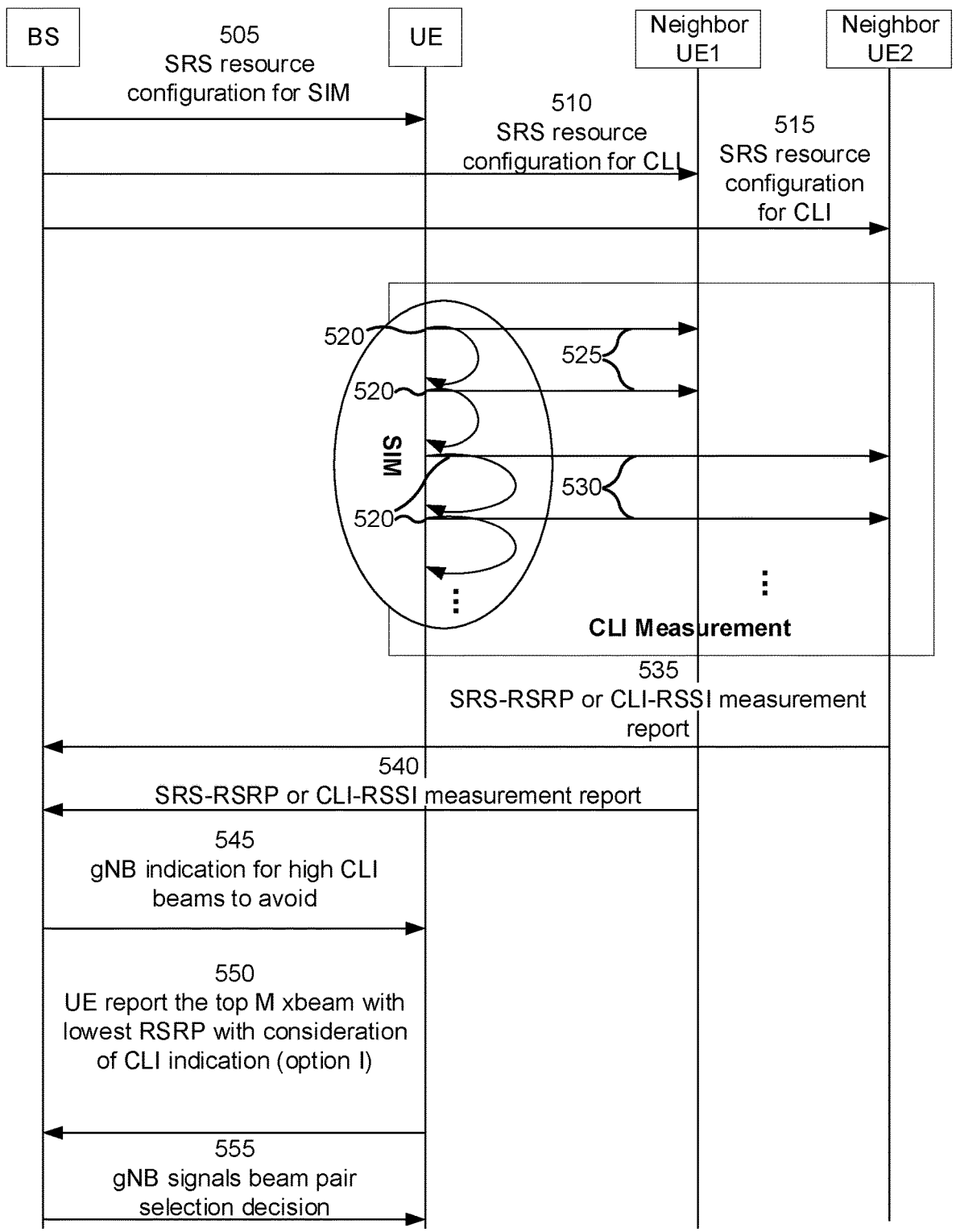
FIG. 5 is a diagram illustrating an example of signaling associated with self-interference measurement for a UE and cross-link interference measurement for one or more neighbor UEs, in accordance with the present disclosure.

FIG. 5 is a diagram illustrating an example 500 of signaling associated with self-interference measurement for a UE and cross-link interference measurement for one or more neighbor UEs. As shown, example 500 includes a BS (e.g., BS 110), a UE (e.g., UE 120), and two neighbor UEs (e.g., UE 120), shown as Neighbor UE1 and Neighbor UE2.

As shown by reference number 505, the BS may provide, to the UE, a resource configuration for SIM. For example, the resource configuration may be an SRS resource configuration that indicates one or more SRSs to be transmitted by the UE 120. As shown by reference numbers 510 and 515, the BS may provide, to the neighbor UEs, resource configurations for CLI measurement. For example, the resource configurations for CLI measurement may be associated with or may share resources with the SRS resource configuration for the SRSs to be transmitted by the UE for SIM. As shown by reference number 520, the UE may transmit SRSs, and may perform SIM based at least in part on the SRSs. The curved arrows from the SRSs back to the UE indicate that the UE performs SIM on the SRSs. As shown by reference number 525 and 530, the neighbor UEs may perform CLI measurements, in accordance with the SRS resource configuration, using the SRSs transmitted by the UE.

As shown by reference numbers 535 and 540, the neighbor UEs may transmit measurement reports based at least in part on the CLI measurements. For example, the measurement reports may include an SRS RSRP report, a CLI RSSI report, and/or the like. In some aspects, as shown by reference number 545, the BS may provide, to the UE, an indication of one or more beams, associated with high CLI measurements (e.g., CLI measurements that satisfy a threshold), that the UE is to avoid.

As shown by reference number 550, the UE may report a top M crossbeams (xbeams) (where M is an integer) with a lowest RSRP of the beams measured by the UE. In some aspects, the top M crossbeams may be selected based at least in part on the CLI indication shown by reference number 545. As shown by reference number 555, the BS may transmit information indicating a beam pair selection decision. For example, the BS may select a UL/DL beam pair for the UE, and may signal the selected UL/DL beam pair to the UE. In some aspects, the BS may select the UL/DL beam pair based at least in part on the CLI measurement feedback shown by reference numbers 535 and 540.

Figure 6:
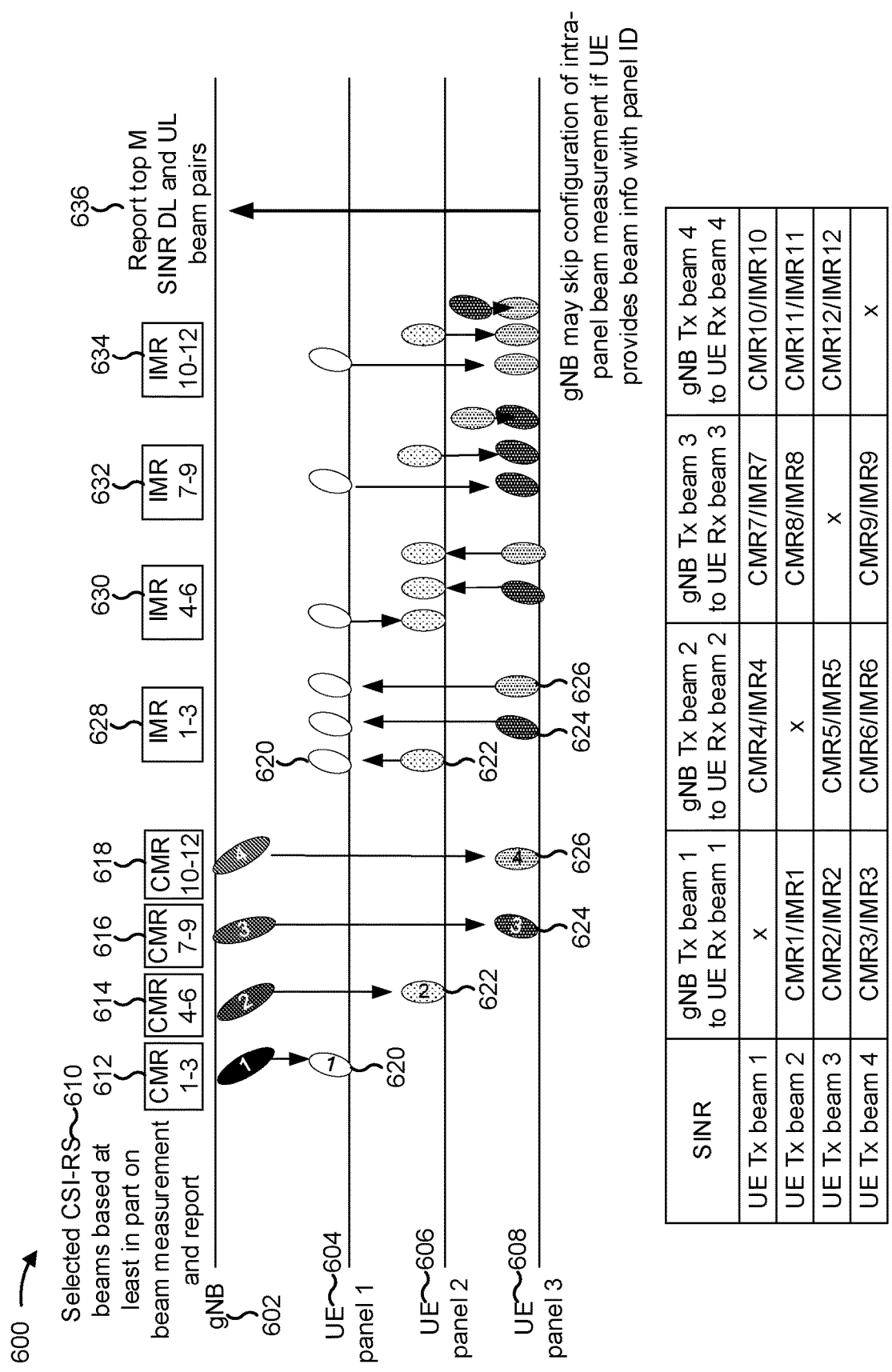
FIG. 6 is a diagram illustrating a beam measurement process, in accordance with the present disclosure.

FIG. 6 is a diagram 600 illustrating a beam measurement process. The diagram 600 of FIG. 6 includes a base station 110, and a UE comprising multiple UE panels (e.g., UE panel1 604, UE panel2 606, UE panel3 608). The base station 110 and UE may be configured to select CSI-RS beams based at least in part on a beam measurement procedure (e.g., 610). The beam measurement procedure 610 may allow for the UE panels (e.g., 604, 606, 608) to measure CSI-RS signals from the base station 110 to determine which of the Rx beams of the best at the UE side, which may be based at least in part on the DL signal strength measured at the UE panels and each Rx beam is associated with a Tx CSI-RS beam at the base station. The beam measurement procedure 610 may allow for the base station 110 to transmit multiple CSI-RS resources to the UE panels in order to measure the DL channel quality or signal strength at the UE side. The UE may send a CSI-RS report to the base station 110 indicating the top Tx beams at the base station with each associated with a top Rx beam at the UE side. The top Rx beams may be assumed to be the top Tx beams at the UE panels based at least in part on channel reciprocity. In some aspects, the UE may report the top four Tx beams. However, in some aspects, the UE may report more or less than the top four Tx beams. Upon the determination of the top four Tx beams with its associated top Rx beams at the UE, the UE may perform a SIM. UE may also report the top four beams each with an associated panel ID of the UE, so that gNB can avoid configuring intra-panel SIM to save resource overhead.

To perform the SIM, the UE may transmit a transmission from the beam 620 from UE panel 1 604, such that beams 622, 624, and 626 may measure the amount of energy they receive from the transmission of the beam 620. The transmission from the beam 620 may be an uplink transmission to the base station 110, however, during the uplink transmission from beam 620 to the base station 110, some energy may be received at the beams of the other panels. Such energy may be due to side lobes or based at least in part on the configuration of the other panels. As such, the beams 622, 624, and 626 may measure the amount of self-interference is caused by the transmission from the beam 620. This process repeats for all of the top four beams indicated in the CSI-RS report. For example, beam 622 may send a transmission such that beams 620, 624, and 626 measure the amount of self-interference caused by the transmission from beam 622. Upon the completion of the self-interference procedure and the channel measurement procedure, the UE may transmit an indication 636 to the base station 110 indicating the top DL and UL beam pairs of the UE in a layer 1 (L1) signal to interference noise ratio (L1-SINR) report via either the actual value or a largest value plus differential value of SINR. The DL and UL beams pairs selected as the top DL and UL beam pairs are beams that have passed a threshold for selection. In some aspects, the UE may report that no beams pass the threshold, such that no feasible beam and/or beam pair is present.

To perform the self-interference measurement, a modified L1-SINR configuration and procedure may be utilized. L1-SINR may include two resource settings, the first resource setting which may be provided by the higher layer parameter resourcesForChannelMeasurement is configured to perform CM via CSI-RS. The CM may measure the channel quality. The second resource which may be provided by either higher layer parameter csi-IM-ResourcesForInterference or the higher layer parameter nzp-CSI-RS-ResourcesForInterference and is configured to perform interference measurement (IM) via CSI-RS. The modified L1-SINR may be configured to utilize SRS, instead of CSI-RS, to perform the IM procedure for SIM purpose. Each CSI-RS resource for channel measurement resource (CMR) may be associated with one SRS resource for interference measurement resource (IMR). The number of CSI-RS resources for CM may equal to the number of SRS resources for IM. The CMR may also be re-used for the original L1-SINR beam management purposes. In addition, the IMR may also be reused for CLI measurement purposes concurrently to measure the cross link interference at neighbor UEs using the same SRS resources used for SIM. In some aspects, the IMR configuration may be configured to define a full or reduced Tx power. For example, the reduced Tx power may be based at least in part on X dBm or X % of the full Tx power. The UE may use the configuration to scale up the calculated SINR accordingly.

With reference to FIG. 6, the diagram 600 provides an example of the CM and IM using the modified L1-SINR configuration and procedure. The CM portion includes four CMRs 612, 614, 616, 618 such that the base station 110 is configured to transmit a CSI-RS to each of the top four Rx beams of the UE. For example, CMR 612 may be transmitted to Rx beam 620 of UE panel1 604, CMR 614 may be transmitted to Rx beam 622 of UE panel2 606, CMR 616 may be transmitted to Rx beam 624 of UE panel3 608, and CMR 618 may be transmitted to Rx beam 626 of UE panel3 608. The UE may measure the channel quality received at the UE by the corresponding Rx beams. The UE may store the channel quality measurements under the CMR to determine the SINR.

The IM portion includes the same or more amount of resources as in the CM portion, such that the CMRs are mapped to a corresponding IMR. For example, each CMR is associated with an IMR for the interference measurement. Each CMR can also be mapped to multiple IMRs for measuring the interference to the same Rx beam as the CMR but transmitting from different beams of different panels of the UE. The IM portion includes four IMRs 628, 630, 632, 634 and are mapped to a corresponding CMR. For example, CMR 612 may be mapped to IMR 628, CMR 614 may be mapped to IMR 630, CMR 616 may be mapped to IMR 632, and CMR 618 may be mapped to IMR 634. The IM portion allows for SIM to be performed. To perform SIM, the IMRs configure the UE with SRS resources. Each of the beams (e.g., 620, 622, 624, 626) may be configured to transmit an SRS. For example, the UE panels when sending the uplink transmission for the SIM may transmit an SRS. The transmitted SRS may be utilized to measure SIM. In some aspects, the UE panel 1 604 may transmit the SRS at beam 620, such that beams 622, 624, and 626 may measure the amount of self-interference that is caused by the transmission from the beam 620. This process repeats for all the other beams 622, 624, 626. For example, beam 622 may send a transmission such that beams 620, 624, and 626 measure the amount of self-interference caused by the transmission from beam 622. Upon the completion of the CM and the SIM, a SINR may be determined.

The mapping of the CMRs and the IMRs allows for a SINR to be calculated based at least in part on the results of the CM and IM portions. The SINR may be determined based at least in part on a ratio of the CMR and the corresponding IMR, as shown in the table of FIG. 6.

The aspect of FIG. 6 provides an example of CM and IM resources being time division multiplexed (TDM), such that the CM portion and the IM portion occur at different times. In some aspects, a DL timing may be utilized for the CM, while an UL timing may be utilized for the IM. In such instances, the SINR may be calculated based at least in part on a ratio of CM and IM and noise (e.g., CM/(IM+noise)). Upon the calculations of the SINR, the UE may report the SINR results to the base station 110. The SINR results may include a report of the top SINR DL and UL beam pairs.

As indicated above, FIG. 6 is provided as an example. Other examples may differ from what is provided with regard to FIG. 6.

Figure 7:
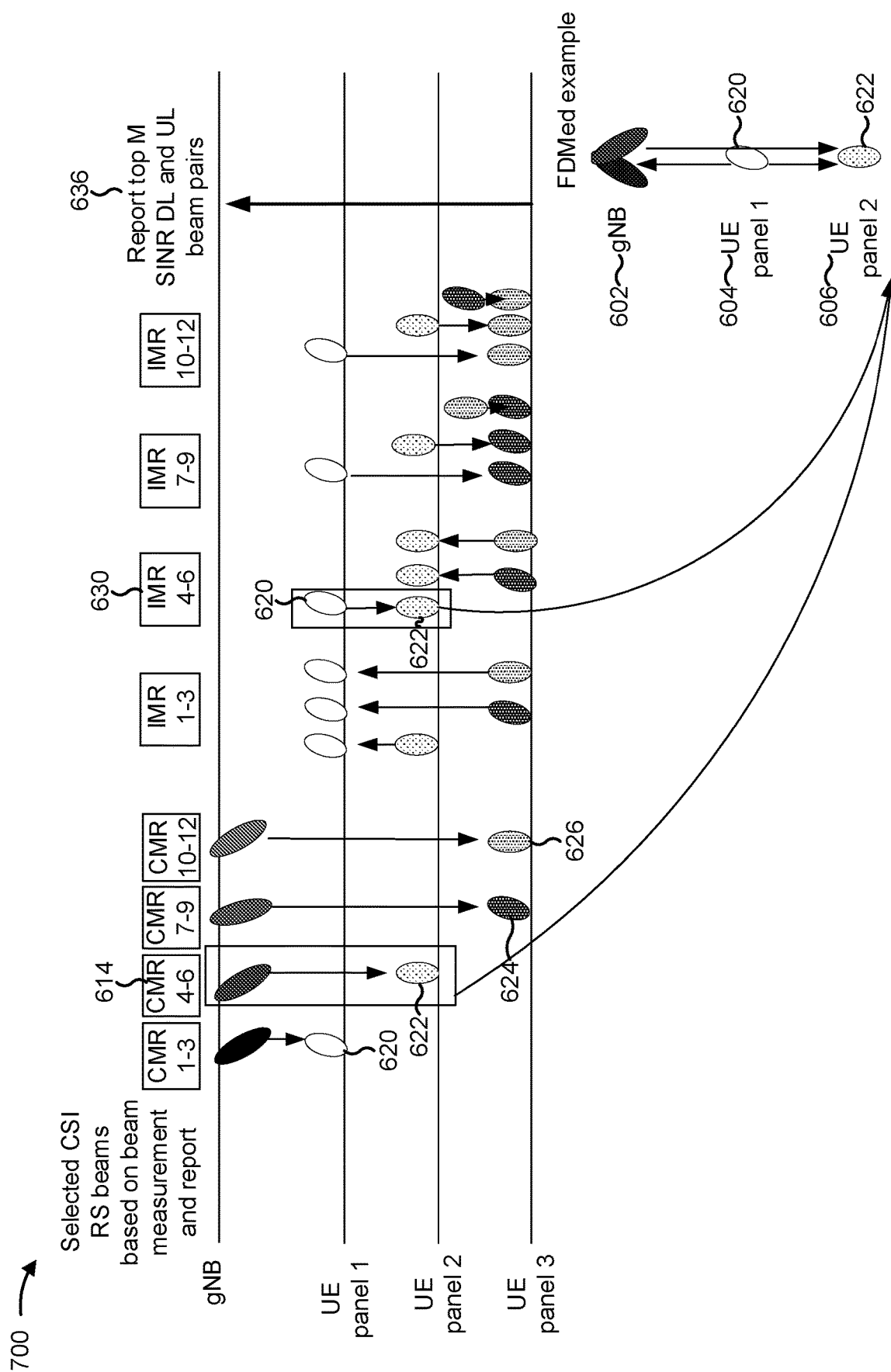
FIG. 7 is a diagram illustrating channel measurement (CM) and interference measurement (IM) using a modified layer 1 (L1) signal to interference noise ratio (L1-SINR) configuration and procedure, in accordance with the present disclosure.

FIG. 7 is a diagram 700 illustrating CM and IM using a modified L1-SINR configuration and procedure. In the example of FIG. 7, the CM and IM resources are configured in a frequency division multiplexed (FDM) configuration, such that the CM and IM occur concurrently. For example, the CMR 614 and IMR 630 are shown in the FDM configuration. The base station 110 may transmit the CSI-RS to be received by beam 622 of UE panel2 606, while the beam 620 transmits the SRS that is received by beam 622 of UE panel2 606. The UE may measure the reception of the CSI-RS and the SRS in order to determine the SINR for the Rx beam 622. In some aspects, the CM and IM procedures under the FDM configuration may experience time misalignment for DL and/or UL reference signals (RSs). In some aspects, the UE may utilized DL timing or UL timing for both the CM and IM procedures concurrently happening in the FDM configuration. In aspects utilizing DL timing, the UE may calculate RSRP of the CSI-RS, and may calculate a partial RSSI for the interference and then an estimated SINR is calculated based at least in part on the CM and IM procedures.

In some aspects, a SINR may not be determined if the Rx and Tx beam are on the same panel. For example, with reference to FIG. 6, a SINR may not be determined for a Rx beam 624 and a Tx beam of 626, because they are one in the same panel. However, the base station may not be aware of the panel ID when configuring the SRS resources for the IMR. In such aspects, the base station may be configured to indicate whether the UE should still transmit the SRS in instances where the SRS beam and the SIM beam are on the same panel. In some aspects, the base station may be configured to indicate whether the UE should still transmit the SRS if the SRS is being reused for a CLI measurement at a neighbor UE.

In some aspects, the UE may be configured to indicate that one or more particular beam pairs may be an infeasible beam pair, such that the SRS beam and the SIM beam are on the same panel. In some aspects, the UE may be configured to indicate to the UE the existence of one or more infeasible beam pairs during the SIM configuration phase. In response to receiving the indication of infeasible beam pairs, the base station may update the SIM configuration and skip or prevent the configuring of intra-panel beam measurements, which may assist in wasting resources. In some aspects, if the UE indicates the existence of infeasible beam pairs, then the reported value of such beam pairs may be reported as background interference, instead of a self-interference value. In some aspects, such as for SIM, the UE may be configured to report beam with panel ID in synchronization signal block (SSB)/CSI-RS measurement, such that the base station may avoid or skip the configuring of intra-panel SIM which may assist in reducing and/or saving resource overhead.

As indicated above, FIG. 7 is provided as an example. Other examples may differ from what is described with regard to FIG. 7.

FIGS. 8A-8C are diagrams illustrating examples 800, 810, and 820 of full duplex (FD) communication. The example 800 of FIG. 8A includes a UE1 802 and two base station (e.g., TRPs) 804-1, 804-2, wherein the UE1 802 is sending UL transmissions to base station 804-1 and is receiving DL transmissions from base station 804-2. In the example 800 of FIG. 8A, FD is enabled for the UE1 802, but not for the base stations 804-1, 804-2. The example 810 of FIG. 8B includes two UEs, UE1 802-1 and UE2 802-2 and a base station 804, wherein the UE1 802-1 is receiving a DL transmission from the base station 804 and the UE2 802-2 is transmitting a UL transmission to the base station 804. In the example 810 of FIG. 8B, FD is enabled for the base station 804, but not for the UEs UE1 802-1 and UE2 802-2. The example 820 of FIG. 8C includes a UE1 802 and a base station 804, wherein the UE1 802 is receiving a DL transmission from the base station 804 and the UE1 802 is transmitting a UL transmission to the base station 804. In the example 820 of FIG. 8C, FD is enabled for both the UE1 802 and the base station 804.

The present disclosure generally relates to improving the manner in which flexible TDD operates to allow for FD communication, simultaneous UL/DL transmission in frequency range 2 (FR2). Flexible TDD capability may be present at either a base station or UE, or both. For example, for a UE, UL transmission may be from one antenna panel and DL reception may be in another antenna panel. FD communication may be conditional on a beam separation of the UL beam and DL beam at the respective antenna panels. As such, improving the manner in which the selection of the UL beam and DL beam for FD communication is performed is desirable. Utilizing FD communication may provide a reduction in latency, such that it may be possible to receive a DL signal in UL only slots, which may enable latency savings. In addition, FD communication may enhance spectrum efficiency per cell or per UE, and may allow for a more efficient utilization of resources.

Beam separation of the UL and DL beams assist in limiting or reducing self-interference that may occur during FD communication. It is desirable to select UL and DL beams that are on different antenna panels to minimize self-interference. Determining the UL and DL beams that are separated on their respective antenna panels may provide a reliable FD communication by selecting beam pairs that minimize or reduce self-interference. As such, measuring the self-interference at the UE may assist in determining beam pairs of UL and DL beams that may support FD communication.

As indicated above, FIGS. 8A-8C are provided as one or more examples. Other examples may differ from what is described with regard to FIGS. 8A-8C.

An FD UE may perform a SIM procedure in association with a CM procedure in order to identify self-interference from transmissions of the FD UE. For example, the FD UE may be configured with resources for the CM procedure and the SIM procedure. The CM procedure may be based at least in part on a determined subset of transmit beams of a base station, wherein CM may be measured based at least in part on CSI-RS transmitted from the base station. The SIM procedure may be based at least in part on SRSs. For example, the configuration for the SIM procedure may configure the UE to sweep through transmitting SRSs from a same Tx beam corresponding to each Rx beam of one antenna array panel of a plurality of different antenna array panels. The configuration for the SIM procedure may configure the UE to receive the transmitted SRS incrementally through other Rx beams associated with the plurality of different panels. For example, the CM and SIM procedures may be performed based at least in part on respective CMR and IMR resources, as described elsewhere herein.

A UE and a base station may communicate using a beam pair. A beam pair may include a pair of beams for communication by a given device. For example, at the BS 110, a beam pair may include a transmit beam (for downlink communication) and a receive beam (for uplink communication). Similarly, at the UE 120, a beam pair may include a transmit beam for uplink communications and a receive beam for downlink communications. The UE 120 may determine the UE 120's beam pair based at least in part on reference signal information, such as a TCI state. A beam pair including a downlink beam and an uplink beam is referred to herein as a DL/UL beam pair. The downlink beam is used for transmissions from the base station to the UE, and the uplink beam is used for transmissions from the UE to the base station.

The FD UE may provide feedback indicating a result of the CM and SIM procedures, such as a L1-SINR measurement value, a SINR report, and/or the like. For example, the feedback may include one or more SINR values for each of the subset of Rx beams with an associated Tx beam of the UE and corresponding Tx and Rx beam IDs or corresponding CSI-RS IDs or resource IDs. The UE may select the top one or more DL and UL beam pairs based at least in part on the SINR values to perform L1-SINR reporting based at least in part on an actual value or a largest value plus a differential value of SINR, wherein the top one or more DL and UL beams pairs pass a threshold. The base station may select a Tx UL beam/Rx DL beam pair with the UE based at least in part on the received SINR report from the UE. However, the SINR report, and/or the selection of the UL/DL beam pair, may not take into account conditions at the base station. This may mean that the selected beam pair may provide suboptimal or poor performance at the base station, thereby decreasing throughput and consuming computing and communication resources.

Some techniques and apparatuses described herein provide determination of an uplink interference measurement (e.g., an uplink signal-to-interference-plus-noise measurement) to be used for selection of beams for SINR reporting and/or for communication between the FD UE and the base station. For example, the base station may determine an uplink interference measurement based at least in part on an IMR of the UE, a CSI-RS report of the UE, or another transmission received from the UE or another UE. In some aspects, the base station may provide the uplink interference measurement to the UE, and the UE may perform SINR reporting based at least in part on the uplink interference measurement. In some aspects, the base station may select the UL/DL beam pair based at least in part on the uplink interference measurement. By taking into account the uplink interference measurement for selection of an UL/DL beam pair, performance at the base station is improved, thereby increasing throughput and improving utilization of computing and communication resources.

Figure 9:
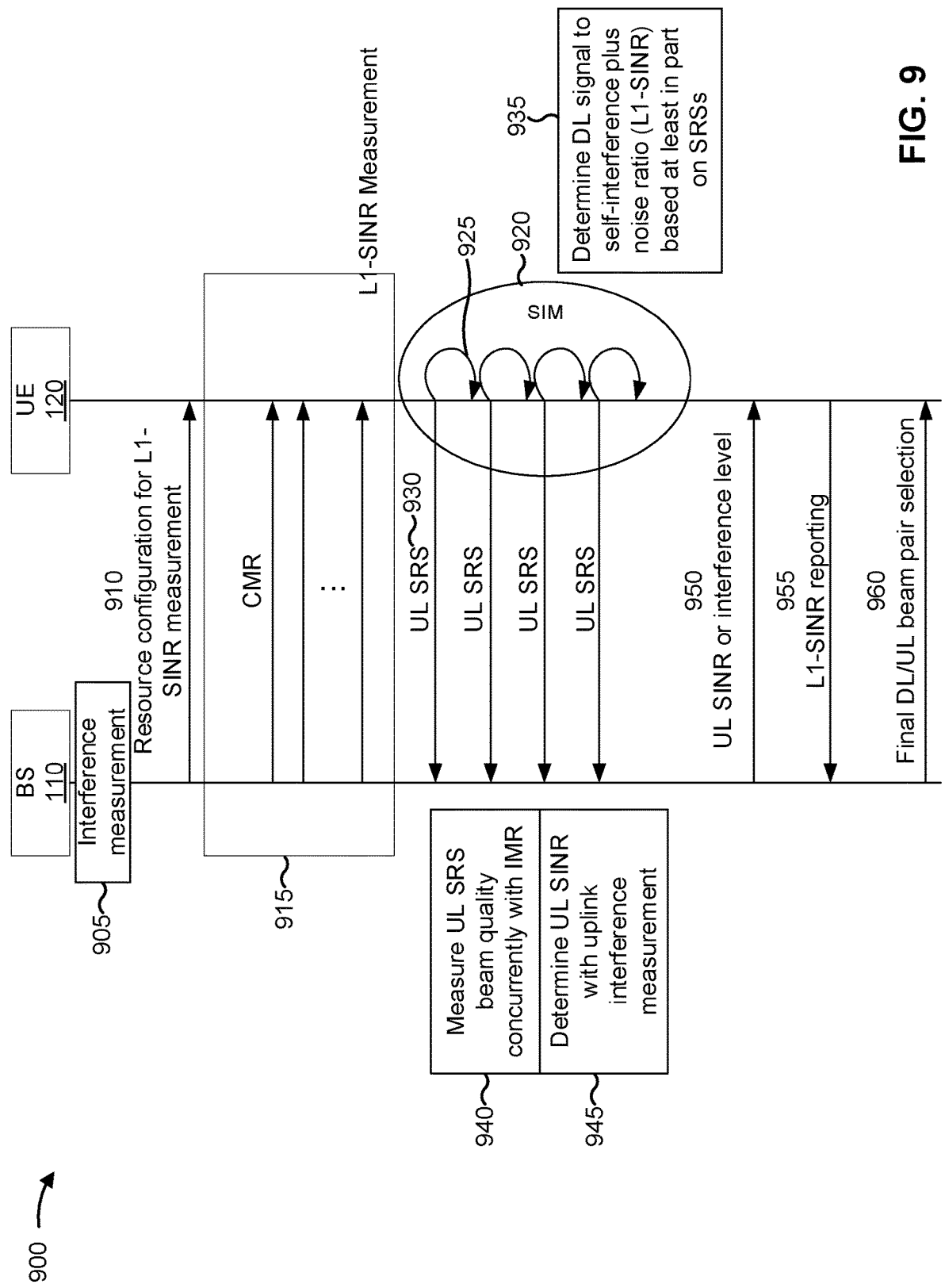
FIG. 9 is a diagram illustrating an example of a call flow illustrating beam pair selection using uplink and downlink measurements, in accordance with the present disclosure.

FIG. 9 is a diagram illustrating an example 900 of a call flow illustrating beam pair selection using uplink and downlink measurements, in accordance with the present disclosure. Example 900 includes a BS 110 and a UE 120. The BS 110 may provide a cell serving UE 120.

As shown by reference number 905, the BS 110 may perform an interference measurement, such as an inter-cell interference measurement. In some aspects, the interference measurement may be used to determine an uplink signal to interference plus noise (SINR) measurement. The interference measurement may include an inter-cell interference measurement or an intra-cell interference measurement. In some aspects, the BS 110 may perform the interference measurements in a transparent way (e.g., without signaling to configure the uplink interference measurements). In some aspects, the BS 110 may allocate a dedicated resource (e.g., a dedicated CSI-RS resource and/or the like) for the uplink interference measurement.

As shown by reference number 910, the BS 110 may provide, to the UE 120, a resource configuration for a L1-SINR measurement. The resource configuration may include a resource configuration for a CM procedure 915 and a resource configuration for a SIM procedure (associated with performing a SIM). The CM procedure 915 may be a procedure for performing a CM. The BS 110 may configure the UE 120 for the CM procedure 915. The CM procedure 915 may be based at least in part on a determined subset of Tx beams (e.g., DL beams) of a base station, wherein CM may be measured based at least in part on CSI-RS transmitted from the BS 110. In some aspects, the CM procedure may be part of a L1-SINR measurement. The UE 120 may perform the CM procedure 915 based at least in part on a determined subset of Rx beams. In some aspects, the CM procedure 915 may comprise performing a channel measurement between each of the subset of Rx beams with a corresponding antenna array panel of the plurality of different antenna array panels, and an associated Tx beam at the BS 110.

The BS 110 may also configure the UE 120 for the SIM procedure 920. The configuration for the SIM procedure 920 may configure the UE 120 to sweep through transmitting SRSs from a same Tx (e.g., UL) beam corresponding to each Rx (e.g., DL) beam of one antenna array panel of a plurality of different antenna array panels. The configuration for the SIM procedure 920 may configure the UE 120 to receive the transmitted SRS incrementally through other Rx beams associated with the plurality of different panels. In some aspects, a plurality of Tx beams may be received by each Rx beam of one panel of the plurality of different panels. In some aspects, a first resource configuring the CM procedure may be associated with a second resource configuring an IM process. The IM process may comprise the SIM procedure, wherein an IMR of the SIM procedure may be concurrently used for CLI measurement. The BS 110 may configure the UE 120 with a transmission power for transmitting SRS as part of the SIM procedure 920. A CMR of the CM procedure 915 may be mapped to one or more IMRs to measure multiple interference Tx beams using a same Rx beam. The Rx beam may be used to receive an associated CSI-RS transmission from a base station for the CM procedure 915. In some aspects, the CM procedure 915 may be used for an L1-SINR beam management process.

In some aspects, the UE 120 may determine a subset of Rx beams based at least in part on a beam measurement process. The BS 110 may configure the UE 120 to perform the beam measurement process. Each Rx beam of the subset of Rx beams may be associated with one antenna array panel of a plurality of different antenna array panels. The beam measurement process may comprise receiving, from a BS 110, RS at each Rx beam of the plurality of different antenna array panels, wherein each Rx beam may be associated with a Tx beam from the BS 110. The subset of Rx beams may be indicated as top or best candidate beams selected based at least in part on the beam management process to be used for sweeping through SRSs of the SIM procedure 920.

As shown by reference number 925, the UE 120 may measure, for at least one pair of DL/UL beams of the subset of Rx beams, a self-interference based at least in part on the received SRS in the SIM procedure 920. The transmission of the SRS is shown, for example, by reference number 930, and the UE 120's measurement of self-interference is represented by the arrow curving from the transmission of the SRS back to the UE 120.

As shown by reference number 935, the UE 120 may determine a downlink self-interference measurement, such as a downlink signal to self-interference plus noise ratio, based at least in part on results of the CM procedure 915 and the SIM procedure 920. A CMR of the CM procedure 915 may be mapped to one or more IMRs of the SIM procedure 920. The downlink signal to self-interference plus noise ratio may be determined based at least in part on pairs of CMR and IMR measurement results. The UE 120 may select one or more of DL/UL beam pairs having a best (e.g., highest) signal to self-interference plus noise ratio. In some aspects, the UE 120 may select M DL/UL beam pairs based at least in part on the SINR, where M≥0.

As shown by reference number 940, the BS 110 may perform an uplink interference measurement, for example, by measuring an UL SRS beam quality concurrently with one or more IMRs. For example, the BS 110 may measure an uplink SRS signal strength based at least in part on the SRSs (shown by reference number 930) transmitted by the UE 120. Thus, the BS 110 may determine the uplink SRS signal strength without configuring additional measurement resources specifically for the uplink interference measurement, thereby reducing overhead. As shown by reference number 945, the BS 110 may determine an uplink SINR based at least in part on the uplink interference measurement (e.g., based at least in part on the interference measurement determined in connection with reference number 905).

As shown by reference number 950, in some aspects, the BS 110 may provide, to the UE 120, uplink interference information indicating the uplink SINR. In some aspects, the BS 110 may provide, to the UE 120, information indicating the interference level per UL Tx beam of the UE measured by the BS 110. If the BS 110 provides the information indicating the interference level, the UE 120 may determine the uplink signal strength and/or the uplink SINR based at least in part on the UE 120's transmit power for the SRSs and a downlink pathloss reference signal.

As shown by reference number 955, the UE 120 may perform L1-SINR reporting. For example, the UE 120 may transmit, to the BS 110, an SINR report indicating the SINR results for multiple pairs of CMR and IMR. The SINR report may include one or more SINR values for each of the subset of Rx beams with an associated Tx beam of the UE and corresponding Tx and Rx beam IDs or corresponding CSI-RS IDs or resource IDs. In some aspects, the UE 120 may select a best one or more DL/UL beam pairs based at least in part on the downlink signal to self-interference plus noise ratio as well as the uplink interference information values. For example, the UE 120 may select the best one or more DL/UL beam pairs based at least in part on one or more corresponding CMs and SIMs associated with the one or more selected DL/UL beam pairs.

As shown by reference number 960, in some aspects, the UE 120 may receive, from the BS 110, an indication (shown by reference number 960) of a selection of a final DL/UL beam pair to be used for communication between the BS 110 and the UE 120 for full duplex transmissions. In some aspects, the final DL/UL beam pair may be selected from the one or more DL/UL beam pairs identified by the L1-SINR reporting. Thus, the BS 110 may select the final DL/UL beam pair from the one or more DL/UL beam pairs reported by the UE 120. The UE 120 may select the one or more DL/UL beam pairs based at least in part on the uplink SINR and the downlink signal to self-interference plus noise ratio. Thus, selection of a DL/UL beam pair for communication between the BS 110 and the UE 120 is performed based at least in part on DL and UL interference measurements, thereby improving likelihood that the final DL/UL beam pair provides acceptable performance at the BS 110. In some aspects, the BS 110 and the UE 120 may communicate using the final DL/UL beam pair (not shown in FIG. 9 for brevity).

As indicated above, FIG. 9 is provided as an example. Other examples may differ from what is described with respect to FIG. 9.

Figure 10:
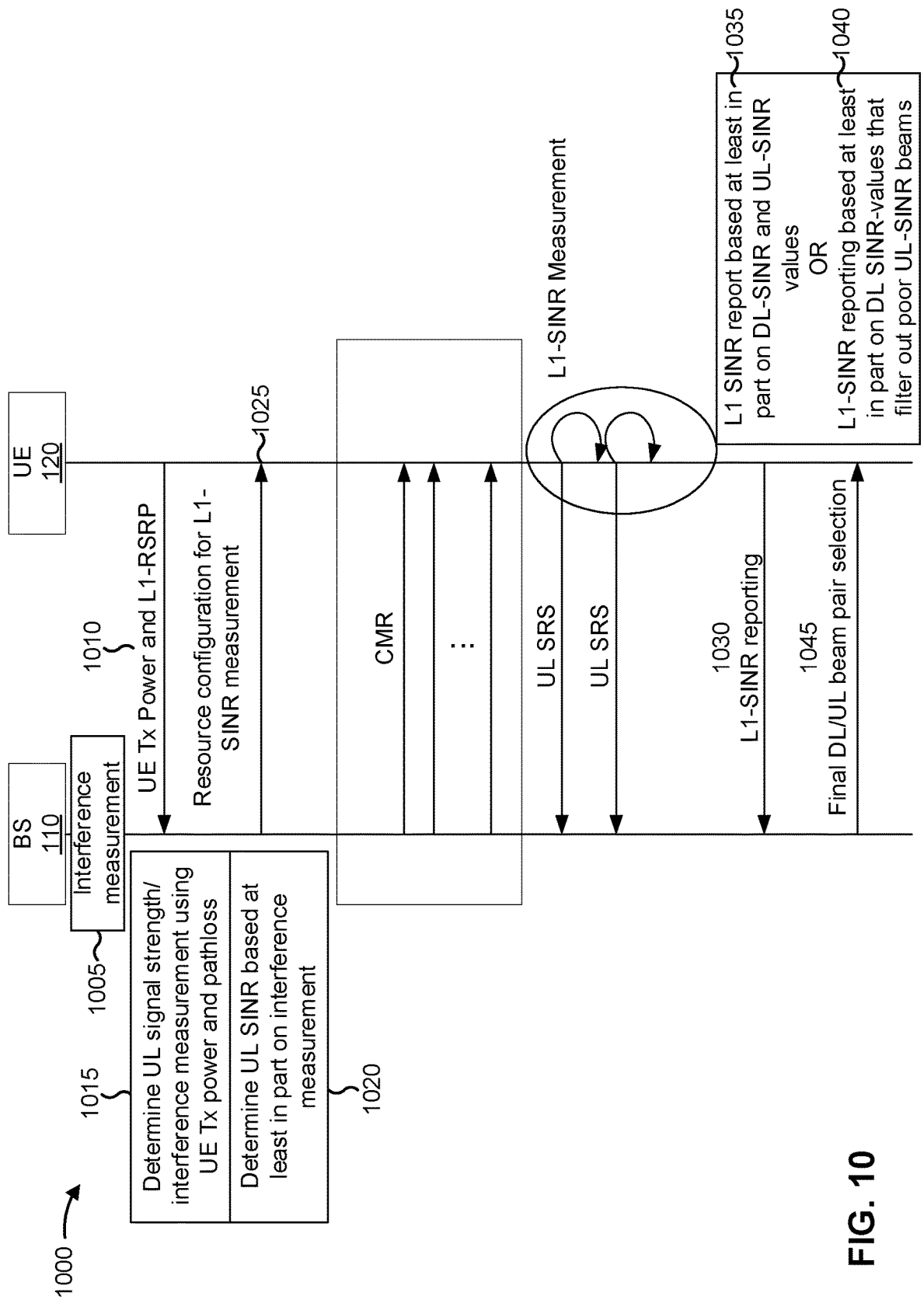
FIG. 10 is a diagram illustrating an example of a call flow illustrating beam pair selection using uplink and downlink measurements, in accordance with the present disclosure.

FIG. 10 is a diagram illustrating an example 1000 of a call flow illustrating beam pair selection using uplink and downlink measurements, in accordance with the present disclosure. Example 1000 includes a BS 110 and a UE 120. The BS 110 may provide a cell serving UE 120. In example 1000, the uplink interference measurement is determined prior to the CM procedure and the SIM procedure, and the uplink interference measurement is provided to the UE 120 prior to the CM procedure and the SIM procedure.

As shown in FIG. 10, and by reference number 1005, the BS 110 may perform (e.g., inter-cell) interference measurement. In some aspects, the BS 110 may use one or more of the operations described in connection with reference number 905 of FIG. 9 to perform the inter-cell interference measurement. In some aspects, the BS 110 may determine the uplink interference measurement based at least in part on a transmit power of the UE and a Layer 1 RSRP of the UE 120, which the UE 120 may provide as shown by reference number 1010. For example, the UE 120 may provide such information (e.g., the transmit power or the Layer 1 RSRP) in a CSI-RS report. As shown by reference number 1015, the BS 110 may determine a UL signal strength and/or an interference measurement using the UE 120's transmit power and a pathloss of the UE 120. For example, the BS 110 may determine the pathloss from a downlink L1-RSRP report of the UE 120. As shown by reference number 1020, the BS 110 may determine an UL-SINR based at least in part on the uplink interference measurement and the interference measurement described in connection with reference number 1005.

As shown by reference number 1025, in some aspects, the BS 110 may provide a resource configuration for L1-SINR measurement, such as for the CM and/or SIM procedures described in connection with FIG. 9. In some aspects, the resource configuration may include information identifying the UL-SINR determined in connection with reference number 1020. In some aspects, the resource configuration may be based at least in part on the UL-SINR. For example, the BS 110 may select a set of UL/DL beam pairs based at least in part on the UL-SINR (e.g., may filter out one or more UE Tx beams based at least in part on the UL-SINR values). The set of UL/DL beam pairs may be associated with a best UL-SINR value, a set of acceptable UL-SINR values, a set of UL-SINR values that satisfy a threshold, and/or the like. The BS 110 may configure the CM procedure and the SIM procedure to be performed for the selected set of UL/DL beam pairs. Thus, in this case, the UL-SINR may not be explicitly signaled to the UE 120.

As shown, the UE 120 may perform the CM and SIM procedures configured in connection with reference number 1025. As shown by reference number 1030, the UE 120 may perform L1-SINR reporting based at least in part on the CM and SIM procedures. In some aspects, as shown by reference number 1035, the UE 120 may determine the L1-SINR report based at least in part on downlink signal to self-interference plus noise and uplink SINR values. For example, the UE 120 may select one or more DL/UL beam pairs based at least in part on a metric for the L1-SINR report, such as a metric defined by max(min(DL signal to self-interference plus noise ratio, UL-SINR)). The UE 120 may use this metric when the BS 110 has provided the UL-SINR to the UE 120, such as in the resource configuration shown by reference number 1025.

In some aspects, as shown by reference number 1040, the UE 120 may determine the L1-SINR report based at least in part on the filtered beams described in connection with reference number 1025. For example, the UE 120 may determine the L1-SINR report for one or more DL/UL beam pairs that were selected by the BS 110 based at least in part on the UL-SINR. In this case, the UE 120 may perform L1-SINR reporting based at least in part on DL signal to self-interference plus noise ratios that filter out poor UL-SINR beams. As shown d, the BS 110 may provide, to the UE 120, information indicating a final DL/UL beam pair selection. For example, the BS 110 may select the final DL/UL beam pair from the one or more DL/UL beam pairs identified by the L1-SINR reporting, and may indicate the final DL/UL beam pair to the UE 120. The BS 110 and the UE 120 may communicate using the final DL/UL beam pair (not shown).

As indicated above, FIG. 10 is provided as an example. Other examples may differ from what is described with regard to FIG. 10.

Figure 11:
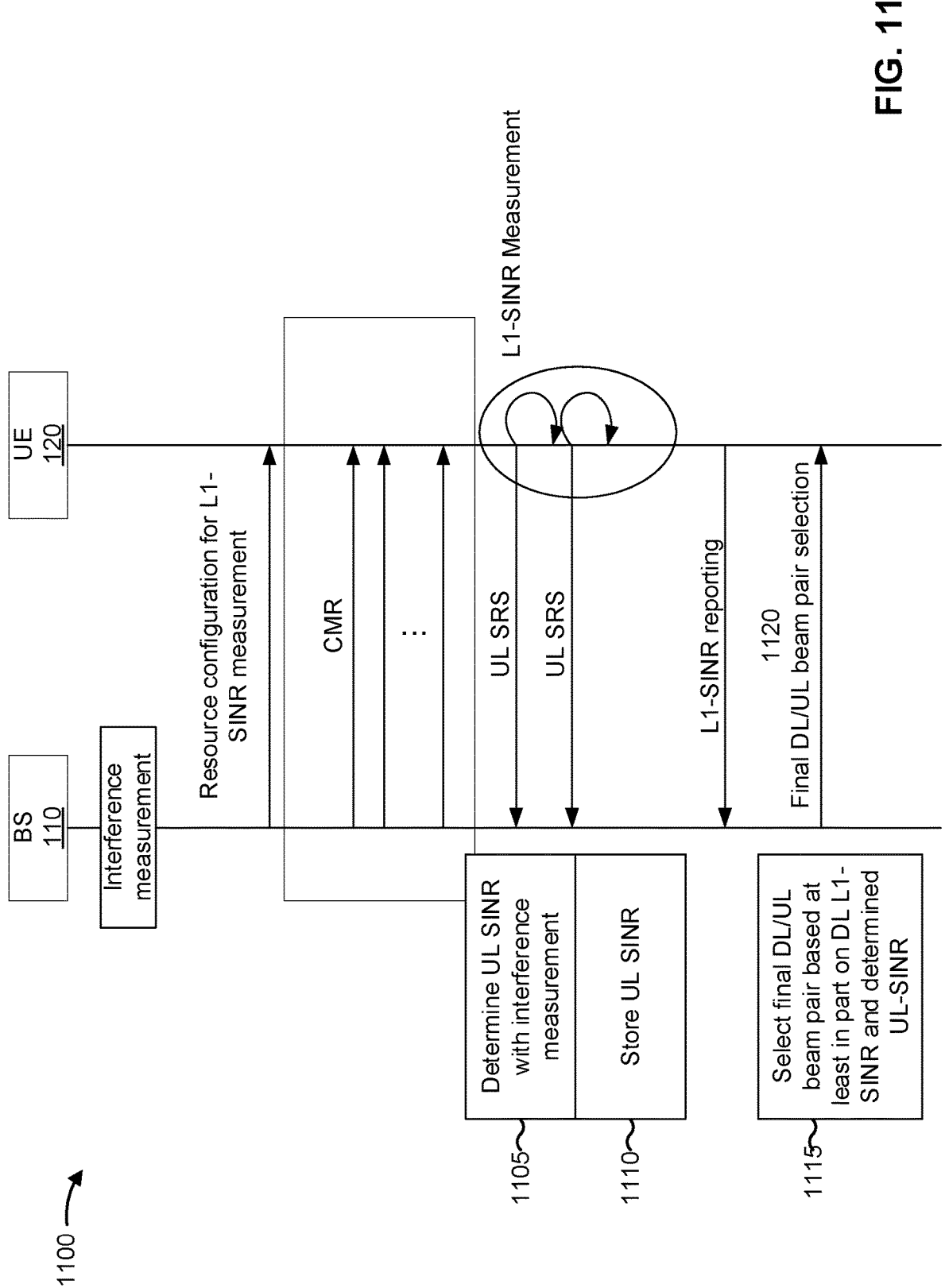
FIG. 11 is a diagram illustrating an example of a call flow illustrating beam pair selection using uplink and downlink measurements, in accordance with the present disclosure.

FIG. 11 is a diagram illustrating an example 1100 of a call flow illustrating beam pair selection using uplink and downlink measurements, in accordance with the present disclosure. Example 1100 includes a BS 110 and a UE 120. The BS 110 may provide a cell serving UE 120. In example 1100, the BS 110 selects the final DL/UL beam pair based at least in part on the UL-SINK. In example 1100, the B S 110 may not provide the UL-SINR to the UE 120, which may conserve signaling resources associated with providing the UL-SINR to the UE 120 and which may reduce specification impact.

The determination of the UL-SINR, shown by reference number 1105, may be performed in accordance with any of the operations described with regard to example 900 of FIG. 9 or example 1000 of FIG. 10. As shown by reference number 1110, the BS 110 may store information indicating the UL-SINR. As shown by reference number 1115, the BS 110 may select a final DL/UL beam pair based at least in part on the UL-SINR and based at least in part on a DL signal to self-interference plus noise ratio reported by the UE 120. The determination and reporting of the DL signal to self-interference plus noise ratio is described in more detail in connection with FIGS. 9 and 10. As shown by reference number 1120, the BS 110 may transmit information indicating the final DL/UL beam pair selection to the UE 120. Thus, the BS 110 may select the final DL/UL beam pair based at least in part on the UL SINR, thereby increasing throughput and reliability of the DL/UL beam pair.

As indicated above, FIG. 11 is provided as an example. Other examples may differ from what is described with regard to FIG. 11.

Figure 12:
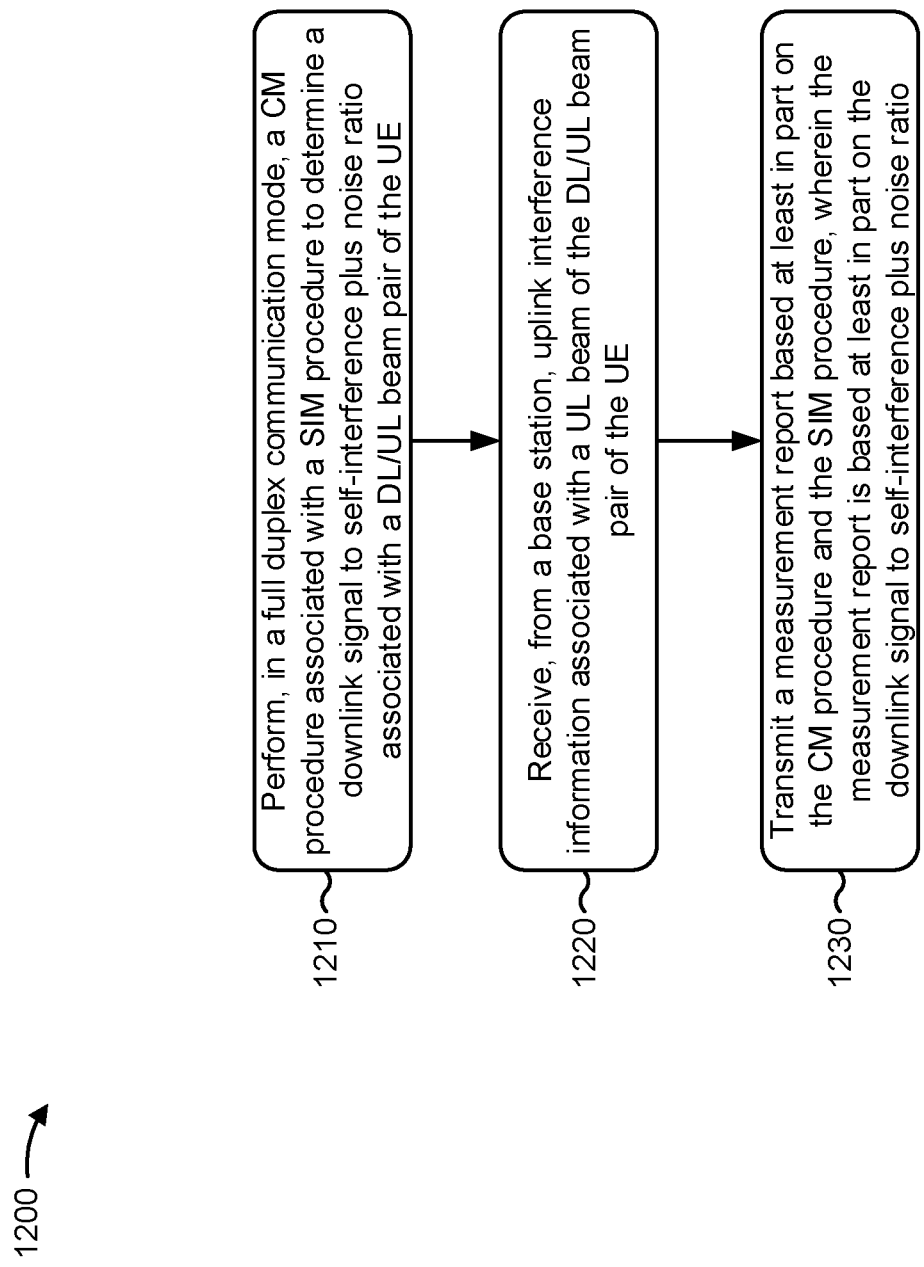
FIG. 12 is a diagram illustrating an example process performed, for example, by a user equipment, in accordance with the present disclosure.

FIG. 12 is a diagram illustrating an example process 1200 performed, for example, by a UE, in accordance with the present disclosure. Example process 1200 is an example where the UE (e.g., UE 120 and/or the like) performs operations associated with beam pair selection using uplink and downlink measurements.

As shown in FIG. 12, in some aspects, process 1200 may include performing, in a full duplex communication mode, a CM procedure associated with a SIM procedure to determine a downlink signal to self-interference plus noise ratio associated with a DL/UL beam pair of the UE (block 1210). For example, the UE (e.g., using antenna 252, DEMOD 254, MIMO detector 256, receive processor 258, controller/processor 280, and/or the like) may perform, in a full duplex communication mode, a CM procedure associated with a SIM procedure to determine a downlink signal to self-interference plus noise ratio associated with a DL/UL beam pair of the UE, as described above.

As further shown in FIG. 12, in some aspects, process 1200 may include receiving, from a base station, uplink interference information associated with a UL beam of the DL/UL beam pair of the UE (block 1220). For example, the UE (e.g., using antenna 252, DEMOD 254, MIMO detector 256, receive processor 258, controller/processor 280, and/or the like) may receive, from a base station, uplink interference information associated with a UL beam of the DL/UL beam pair of the UE, as described above. In some aspects, the uplink interference information indicates at least one of an uplink interference measurement determined by the base station or a final DL/UL beam pair selected by the base station.

As further shown in FIG. 12, in some aspects, process 1200 may include transmitting a measurement report based at least in part on the CM procedure and the SIM procedure, wherein the measurement report is based at least in part on the downlink signal to self-interference plus noise ratio (block 1230). For example, the UE (e.g., using controller/processor 280, transmit processor 264, TX MIMO processor 266, MOD 254, antenna 252, and/or the like) may transmit a measurement report based at least in part on the CM procedure and the SIM procedure, as described above. In some aspects, the measurement report is based at least in part on the downlink signal to self-interference plus noise ratio. In some aspects, if the uplink interference information indicates the uplink interference measurement, the measurement report is based at least in part on the uplink interference information. In some aspects, if the uplink interference information indicates the final DL/UL beam pair, the uplink interference information is received after the measurement report is transmitted.

Process 1200 may include additional aspects, such as any single aspect or any combination of aspects described below and/or in connection with one or more other processes described elsewhere herein.

In a first aspect, the uplink interference information is received after the CM procedure and the SIM procedure are performed.

In a second aspect, alone or in combination with the first aspect, the uplink interference measurement is based at least in part on a reference signal transmitted on an interference measurement resource by the UE as part of the SIM procedure.

In a third aspect, alone or in combination with one or more of the first and second aspects, the uplink interference measurement indicates at least one of: a signal to interference plus noise ratio measurement, or an interference level.

In a fourth aspect, alone or in combination with one or more of the first through third aspects, process 1200 includes determining an uplink signal to interference plus noise ratio based at least in part on the interference level, wherein the measurement report is being based at least in part on the uplink signal to interference plus noise ratio.

In a fifth aspect, alone or in combination with one or more of the first through fourth aspects, the measurement report relates to one or more selected DL/UL beam pairs of the UE, and process 1200 further comprises: selecting the one or more selected DL/UL beam pairs from a plurality of DL/UL beam pairs based at least in part on one or more selected CMs and SIMs associated with the one or more selected DL/UL beam pairs, the one or more selected beam pairs are selected based at least in part on the one or more selected CMs and SIMs being associated with a best one or more values of a metric of respective CMs and SIMs of the plurality of DL/UL beam pairs.

In a sixth aspect, alone or in combination with one or more of the first through fifth aspects, the metric uses a minimum value of one or more corresponding downlink signal to interference plus noise ratios and one or more corresponding uplink signal to interference plus noise ratios associated with the one or more selected DL/UL beam pairs.

In a seventh aspect, alone or in combination with one or more of the first through sixth aspects, the uplink interference information is received before the CM procedure and the SIM procedure are performed.

In an eighth aspect, alone or in combination with one or more of the first through seventh aspects, process 1200 includes transmitting information indicating a transmit power of the UE, wherein the information is indicating the transmit power is used to determine an uplink signal to interference plus noise ratio.

In a ninth aspect, alone or in combination with one or more of the first through eighth aspects, the information indicating the transmit power of the UE is transmitted in a channel state information reference signal report.

In a tenth aspect, alone or in combination with one or more of the first through ninth aspects, the uplink interference information is provided in association with configuration information associated with a CM and SIM measurement resource.

In an eleventh aspect, alone or in combination with one or more of the first through tenth aspects, the measurement report relates to one or more selected DL/UL beam pairs of the UE, and process 1200 further comprises: selecting the one or more selected DL/UL beam pairs from a plurality of DL/UL beam pairs based at least in part on one or more selected CMs and SIMs associated with the one or more selected DL/UL beam pairs, the one or more selected beam pairs are selected based at least in part on the one or more selected CMs and SIMs being associated with a best one or more values of a metric of respective CMs and SIMs of the plurality of DL/UL beam pairs.

In a twelfth aspect, alone or in combination with one or more of the first through eleventh aspects, the metric uses a minimum value of a downlink signal to self-interference plus noise ratio and an uplink signal to interference plus noise ratio associated with the selected DL/UL beam pair.

In a thirteenth aspect, alone or in combination with one or more of the first through twelfth aspects, process 1200 includes receiving configuration information associated with CM and SIM measurement resources for a set of DL/UL beam pairs, wherein the set of DL/UL beam pairs is being selected based at least in part on the uplink interference information.

In a fourteenth aspect, alone or in combination with one or more of the first through thirteenth aspects, process 1200 includes In a fifteenth aspect, alone or in combination with one or more of the first through fourteenth aspects, the final DL/UL beam pair is selected based at least in part on the downlink signal to self-interference plus noise ratio in the measurement report and an uplink signal to interference plus noise ratio determined by the base station.

In a sixteenth aspect, alone or in combination with one or more of the first through fifteenth aspects, process 1200 includes determining one or more selected DL/UL beam pairs based at least in part on the uplink interference information; reporting the one or more selected DL/UL beam pairs; receiving the uplink interference information indicating the final DL/UL beam pair selected by the base station; and communicating with the base station using the final DL/UL beam pair in the full duplex communication mode.

In a seventeenth aspect, alone or in combination with one or more of the first through sixteenth aspects, the final DL/UL beam pair is identified based at least in part on the downlink signal to self-interference plus noise ratio and an uplink signal to interference plus noise ratio.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
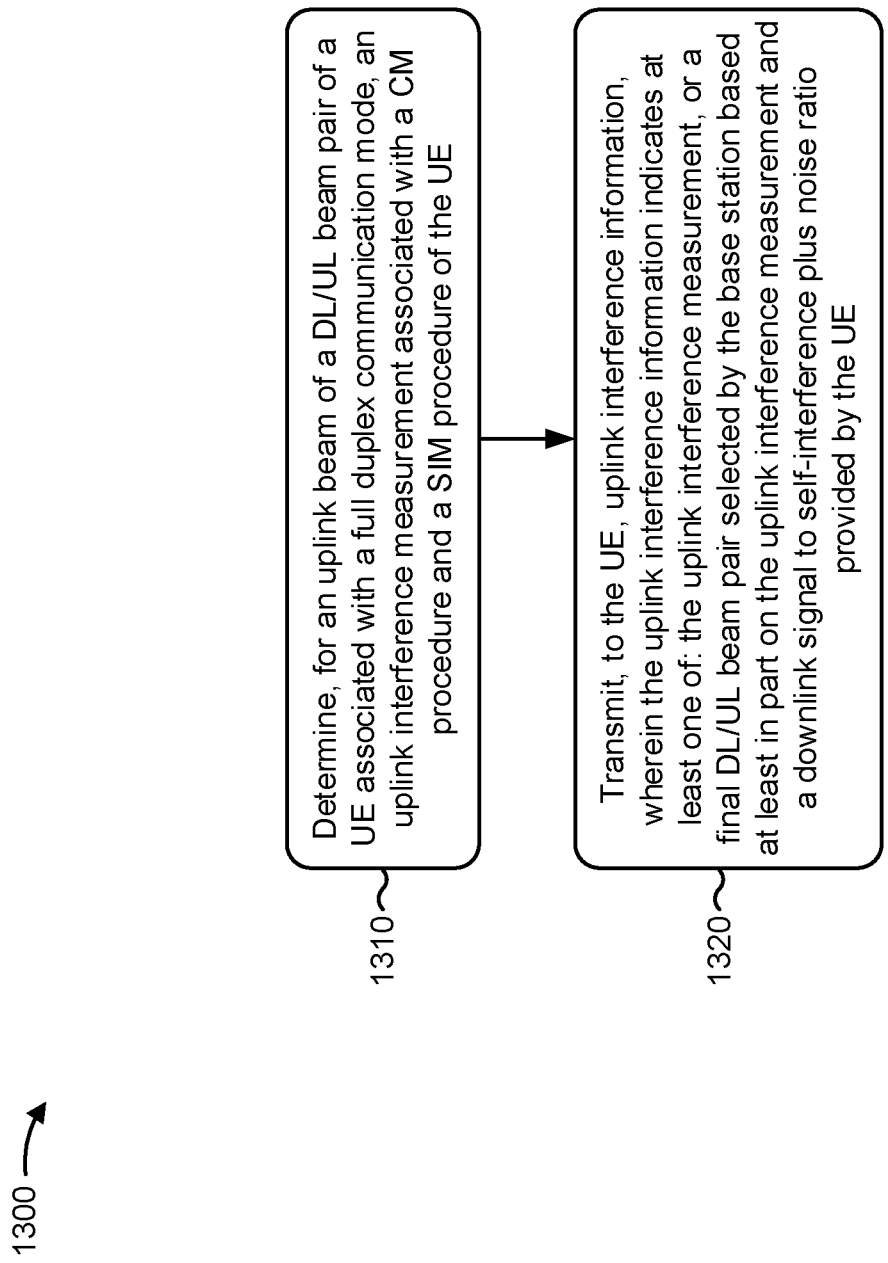
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station and/or the like) performs operations associated with beam pair selection using uplink and downlink measurements.

As shown in FIG. 13, in some aspects, process 1300 may include determining, for an uplink beam of a DL/UL beam pair of a UE associated with a full duplex communication mode, an uplink interference measurement associated with a CM procedure and a SIM procedure of the UE (block 1310). For example, the base station (e.g., using controller/processor 240 and/or the like) may determine, for an uplink beam of a DL/UL beam pair of a UE associated with a full duplex communication mode, an uplink interference measurement associated with a CM procedure and a SIM procedure of the UE, as described above.

As further in FIG. 13, in some aspects, process 1300 may include transmitting, to the UE, uplink interference information, wherein the uplink interference information indicates at least one of: the uplink interference measurement, or a final DL/UL beam pair selected by the base station based at least in part on the uplink interference measurement and a downlink signal to self-interference plus noise ratio provided by the UE (block 1320). For example, the base station (e.g., using controller/processor 240 and/or the like) may transmit, to the UE, uplink interference information. The uplink interference information may indicate at least one of: the uplink interference measurement, or a final DL/UL beam pair selected by the base station based at least in part on the uplink interference measurement and a downlink signal to self-interference plus noise ratio provided by the UE, as described above.

Process 1300 may include additional aspects, such as any single aspect or any combination of aspects described below and/or in connection with one or more other processes described elsewhere herein.

In a first aspect, process 1300 includes receiving a measurement report based at least in part on the CM procedure and the SIM procedure, wherein the measurement report is based at least in part on the CM procedure and the SIM procedure, and wherein, if the uplink interference information indicates the uplink interference measurement, the measurement report is based at least in part on the uplink interference information.

In a second aspect, alone or in combination with the first aspect, the uplink interference information is transmitted after the CM procedure and the SIM procedure are performed.

In a third aspect, alone or in combination with one or more of the first and second aspects, the uplink interference measurement is determined based at least in part on a reference signal transmitted on an interference measurement resource of the UE, and the reference signal is transmitted as part of the CM procedure or the SIM procedure.

In a fourth aspect, alone or in combination with one or more of the first through third aspects, the uplink interference measurement indicates at least one of: an uplink signal to interference plus noise ratio measurement, or an interference level.

In a fifth aspect, alone or in combination with one or more of the first through fourth aspects, the uplink interference information is transmitted before the CM procedure and the SIM procedure are performed.

In a sixth aspect, alone or in combination with one or more of the first through fifth aspects, process 1300 includes receiving information indicating a transmit power of the UE, wherein the uplink interference measurement is being determined based at least in part on the information indicating the transmit power.

In a seventh aspect, alone or in combination with one or more of the first through sixth aspects, the information indicating the transmit power of the UE is received in a channel state information reference signal report.

In an eighth aspect, alone or in combination with one or more of the first through seventh aspects, the uplink interference information is transmitted in association with configuration information associated with a CM and SIM measurement resource.

In a ninth aspect, alone or in combination with one or more of the first through eighth aspects, process 1300 includes transmitting configuration information associated with interference measurement resources for one or more selected DL/UL beam pairs, wherein the one or more selected DL/UL beam pairs are selected based at least in part on the uplink interference information.

In a tenth aspect, alone or in combination with one or more of the first through ninth aspects, the one or more selected DL/UL beam pairs are selected from a plurality of DL/UL beam pairs based at least in part on respective uplink interference measurements associated with the one or more selected DL/UL beam pairs, the one or more selected DL/UL beam pairs are selected based at least in part on the respective uplink interference measurements being associated with a best one or more values of a metric of the respective uplink interference measurements of the plurality of DL/UL beam pairs.

In an eleventh aspect, alone or in combination with one or more of the first through tenth aspects, the final DL/UL beam pair is selected based at least in part on the downlink signal to self-interference plus noise ratio and the uplink interference measurement.

In a twelfth aspect, alone or in combination with one or more of the first through eleventh aspects, process 1300 includes receiving the downlink signal to self-interference plus noise ratio from the UE prior to transmitting the uplink interference information.

In a thirteenth aspect, alone or in combination with one or more of the first through twelfth aspects, process 1300 includes receiving a measurement report indicating one or more selected DL/UL beam pairs based at least in part on the uplink interference information; selecting the final DL/UL beam pair based at least in part on the uplink interference measurement; transmitting the uplink interference information indicating the final DL/UL beam pair; and communicating with the UE using the final DL/UL beam pair.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The following provides an overview of some Aspects of the present disclosure:

Aspect 1: A method of wireless communication performed by a user equipment (UE), comprising: performing, in a full duplex communication mode, a channel measurement (CM) associated with a self-interference measurement (SIM) to determine a downlink signal to self-interference plus noise ratio associated with a downlink (DL) and uplink (UL) (DL/UL) beam pair of the UE; receiving, from a base station, uplink interference information associated with a UL beam of the DL/UL beam pair of the UE, wherein the uplink interference information indicates at least one of: an uplink interference measurement determined by the base station, or a final DL/UL beam pair selected by the base station; and transmitting a measurement report based at least in part on the CM and the SIM, wherein the measurement report is based at least in part on the downlink signal to self-interference plus noise ratio, wherein, if the uplink interference information indicates the uplink interference measurement, the measurement report is based at least in part on the uplink interference information, and wherein, if the uplink interference information indicates the final DL/UL beam pair, the uplink interference information is received after the measurement report is transmitted.

Aspect 2: The method of Aspect 1, wherein the uplink interference information is received after the CM and the SIM are performed.

Aspect 3: The method of Aspect 1, wherein the uplink interference measurement is based at least in part on a reference signal transmitted on an interference measurement resource by the UE as part of the SIM.

Aspect 4: The method of Aspect 1, wherein the measurement report relates to one or more selected DL/UL beam pairs of the UE, and wherein the method further comprises: selecting the one or more selected DL/UL beam pairs from a plurality of DL/UL beam pairs based at least in part on one or more selected CMs and SIMs associated with the one or more selected DL/UL beam pairs, wherein the one or more selected beam pairs are selected based at least in part on the one or more selected CMs and SIMS being associated with a best one or more values of a metric of respective CMs and SIMS of the plurality of DL/UL beam pairs.

Aspect 5: The method of Aspect 4, wherein the metric uses a minimum value of one or more corresponding downlink signal to self-interference plus noise ratios and one or more corresponding uplink signal to interference plus noise ratios associated with the one or more selected DL/UL beam pairs.

Aspect 6: The method of Aspect 1, wherein the uplink interference information is received before the CM and the SIM are performed.

Aspect 7: The method of Aspect 6, further comprising: transmitting information indicating a transmit power of the UE, wherein the information indicating the transmit power is used to determine an uplink signal to interference plus noise ratio.

Aspect 8: The method of Aspect 6, wherein the uplink interference information is provided in association with configuration information associated with a CM and SIM measurement resource.

Aspect 9: The method of Aspect 8, wherein the measurement report relates to one or more selected DL/UL beam pairs of the UE, and wherein the method further comprises: selecting the one or more selected DL/UL beam pairs from a plurality of DL/UL beam pairs based at least in part on one or more selected CMs and SIMs associated with the one or more selected DL/UL beam pairs, wherein the one or more selected beam pairs are selected based at least in part on the one or more selected CMs and SIMS being associated with a best one or more values of a metric of respective CMs and SIMS of the plurality of DL/UL beam pairs.

Aspect 10: The method of Aspect 9, wherein the metric uses a minimum value of a downlink signal to self-interference plus noise ratio and an uplink signal to interference plus noise ratio associated with the selected DL/UL beam pair.

Aspect 11: The method of Aspect 6, further comprising: receiving configuration information associated with CM and SIM measurement resources for a set of DL/UL beam pairs, wherein the set of DL/UL beam pairs are selected based at least in part on the uplink interference information.

Aspect 12: The method of Aspect 11, further comprising: selecting one or more selected DL/UL beam pairs, from the set of DL/UL beam pairs, based at least in part on uplink interference information corresponding to the one or more selected DL/UL beam pairs.

Aspect 13: The method of Aspect 1, further comprising: determining one or more selected DL/UL beam pairs based at least in part on the uplink interference information; reporting the one or more selected DL/UL beam pairs; receiving the uplink interference information indicating the final DL/UL beam pair selected by the base station; and communicating with the base station using the final DL/UL beam pair in the full duplex communication mode.

Aspect 14: A method of wireless communication performed by a base station, comprising: performing, for an uplink beam of a downlink and uplink (DL/UL) beam pair of a user equipment (UE) associated with a full duplex communication mode, an uplink interference measurement associated with a channel measurement (CM) and a self-interference measurement (SIM) of the UE; and transmitting, to the UE, uplink interference information, wherein the uplink interference information indicates at least one of: the uplink interference measurement, or a final DL/UL beam pair selected by the base station based at least in part on the uplink interference measurement and a downlink signal to self-interference plus noise ratio provided by the UE.

Aspect 15: The method of Aspect 14, further comprising: receiving a measurement report based at least in part on the CM and the SIM, wherein the measurement report is based at least in part on the CM and the SIM, and wherein, if the uplink interference information indicates the uplink interference measurement, the measurement report is based at least in part on the uplink interference information.

Aspect 16: The method of Aspect 14, wherein the uplink interference information is transmitted after the CM and the SIM are performed.

Aspect 17: The method of Aspect 14, wherein the uplink interference information is transmitted before the CM and the SIM are performed.

Aspect 18: The method of Aspect 17, further comprising: receiving information indicating a transmit power of the UE, wherein the uplink interference measurement is determined based at least in part on the information indicating the transmit power.

Aspect 19: The method of Aspect 17, wherein the uplink interference information is transmitted in association with configuration information associated with a CM and SIM measurement resource.

Aspect 20: The method of Aspect 17, further comprising: transmitting configuration information associated with interference measurement resources for one or more selected DL/UL beam pairs, wherein the one or more selected DL/UL beam pairs are selected based at least in part on the uplink interference information.

Aspect 21: The method of Aspect 14, wherein the final DL/UL beam pair is selected based at least in part on the downlink signal to self-interference plus noise ratio and the uplink interference measurement, and wherein the method further comprises: receiving the downlink signal to self-interference plus noise ratio from the UE prior to transmitting the uplink interference information.

Aspect 22: The method of Aspect 14, further comprising: receiving a measurement report indicating one or more selected DL/UL beam pairs based at least in part on the uplink interference information; selecting the final DL/UL beam pair based at least in part on the uplink interference measurement; transmitting the uplink interference information indicating the final DL/UL beam pair; and communicating with the UE using the final DL/UL beam pair.

Aspect 23: An apparatus for wireless communication at a device, comprising a processor; memory coupled with the processor; and instructions stored in the memory and executable by the processor to cause the apparatus to perform the method of one or more Aspects of Aspects 1-22.

Aspect 24: A device for wireless communication, comprising a memory and one or more processors coupled to the memory, the memory and the one or more processors configured to perform the method of one or more Aspects of Aspects 1-22.

Aspect 25: An apparatus for wireless communication, comprising at least one means for performing the method of one or more Aspects of Aspects 1-22.

Aspect 26: A non-transitory computer-readable medium storing code for wireless communication, the code comprising instructions executable by a processor to perform the method of one or more Aspects of Aspects 1-22.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      perform, in a full duplex communication mode, a channel measurement (CM) associated with a self-interference measurement (SIM) to determine a downlink signal to self-interference plus noise ratio associated with a downlink (DL) and uplink (UL) (DL/UL) beam pair of the UE, the SIM performed in accordance with a reference signal corresponding to a cross link interference (CLI) measurement;
      receive, from a network entity, uplink interference information associated with a UL beam of the DL/UL beam pair of the UE, wherein the uplink interference information indicates at least one of:
         an uplink interference measurement determined by the network entity, or
         a final DL/UL beam pair selected by the network entity; and
      transmit a measurement report based at least in part on the CM and the SIM, wherein the measurement report is based at least in part on the downlink signal to self-interference plus noise ratio,
      wherein, if the uplink interference information indicates the uplink interference measurement, the measurement report is based at least in part on the uplink interference measurement and the downlink signal to self-interference plus noise ratio, and
      wherein, if the uplink interference information indicates the final DL/UL beam pair and not the uplink interference measurement, the uplink interference information is received after the measurement report is transmitted.

2. The UE of claim 1, wherein the uplink interference information indicates the uplink interference measurement, wherein the uplink interference measurement indicates an interference level, and wherein the uplink interference information is received after the CM and the SIM are performed.

3. The UE of claim 1, wherein the uplink interference measurement is based at least in part on a reference signal transmitted on an interference measurement resource by the UE as part of the SIM.

4. The UE of claim 1, wherein the measurement report relates to one or more selected DL/UL beam pairs of the UE, and wherein the one or more processors are configured to:
   select the one or more selected DL/UL beam pairs from a plurality of DL/UL beam pairs based at least in part on one or more selected CMs and SIMs associated with the one or more selected DL/UL beam pairs, wherein the one or more selected beam pairs are selected based at least in part on the one or more selected CMs and SIMs being associated with a best one or more values of a metric of respective CMs and SIMs of the plurality of DL/UL beam pairs.

5. The UE of claim 4, wherein the uplink interference information indicates the uplink interference measurement, and wherein the metric uses a minimum value of one or more corresponding downlink signal to self-interference plus noise ratios and one or more corresponding uplink signal to interference plus noise ratios associated with the one or more selected DL/UL beam pairs.

6. The UE of claim 1, wherein the uplink interference information indicates the uplink interference measurement, and wherein the uplink interference measurement is received before the CM and the SIM are performed.

7. The UE of claim 6, wherein the one or more processors are further configured to:
transmit information indicating a transmit power of the UE, wherein the information indicating the transmit power corresponds to an uplink signal to interference plus noise ratio that the UE uses to determine the measurement report.

8. The UE of claim 6, wherein the uplink interference information is provided in association with configuration information associated with a CM and SIM measurement resource.

9. The UE of claim 8, wherein the measurement report relates to one or more selected DL/UL beam pairs of the UE, and wherein the one or more processors are configured to:
select the one or more selected DL/UL beam pairs from a plurality of DL/UL beam pairs based at least in part on one or more selected CMs and SIMs associated with the one or more selected DL/UL beam pairs, wherein the one or more selected beam pairs are selected based at least in part on the one or more selected CMs and SIMs being associated with a best one or more values of a metric of respective CMs and SIMs of the plurality of DL/UL beam pairs.

10. The UE of claim 9, wherein the metric uses a minimum value of a downlink signal to self-interference plus noise ratio and an uplink signal to interference plus noise ratio associated with the selected DL/UL beam pair.

11. The UE of claim 6, wherein the one or more processors are further configured to:
receive configuration information associated with CM and SIM measurement resources for a set of DL/UL beam pairs, wherein the set of DL/UL beam pairs are selected based at least in part on the uplink interference information.

12. The UE of claim 11, wherein the one or more processors are further configured to:
select one or more selected DL/UL beam pairs, from the set of DL/UL beam pairs, based at least in part on uplink interference information corresponding to the one or more selected DL/UL beam pairs.

13. The UE of claim 1, wherein the uplink interference information indicates the uplink interference measurement and the final DL/UL beam pair, and wherein the one or more processors are further configured to:
determine one or more selected DL/UL beam pairs based at least in part on the uplink interference measurement;
report the one or more selected DL/UL beam pairs;
receive an indication of the final DL/UL beam pair selected by the network entity; and
communicate with the network entity using the final DL/UL beam pair in the full duplex communication mode.

14. A network entity for wireless communication, comprising:
a memory; and
one or more processors, coupled to the memory, configured to:
perform, for an uplink beam of a downlink and uplink (DL/UL) beam pair of a user equipment (UE) associated with a full duplex communication mode, an uplink interference measurement associated with a channel measurement (CM) and a self-interference measurement (SIM) of the UE, the SIM performed in accordance with a reference signal corresponding to a cross link interference (CLI) measurement; and
transmit, to the UE, uplink interference information, wherein the uplink interference information indicates at least one of:
the uplink interference measurement, or
a final DL/UL beam pair selected by the network entity based at least in part on the uplink interference measurement and a downlink signal to self-interference plus noise ratio provided by the UE.

15. The network entity of claim 14, wherein the one or more processors are further configured to:
receive a measurement report based at least in part on the CM and the SIM, wherein the measurement report is based at least in part on the CM and the SIM, and wherein, if the uplink interference information indicates the uplink interference measurement, the measurement report is based at least in part on the uplink interference measurement and the downlink signal to self-interference plus noise ratio.

16. The network entity of claim 14, wherein the uplink interference information indicates the uplink interference measurement, wherein the uplink interference measurement indicates an interference level, and wherein the uplink interference information is transmitted after the CM and the SIM are performed.

17. The network entity of claim 14, wherein the uplink interference information indicates the uplink interference measurement, and wherein the uplink interference measurement is transmitted before the CM and the SIM are performed.

18. The network entity of claim 17, wherein the one or more processors are further configured to:
receive information indicating a transmit power of the UE, wherein the uplink interference measurement is determined based at least in part on the information indicating the transmit power.

19. The network entity of claim 17, wherein the uplink interference information is transmitted in association with configuration information associated with a CM and SIM measurement resource.

20. The network entity of claim 17, wherein the one or more processors are further configured to:
transmit configuration information associated with interference measurement resources for one or more selected DL/UL beam pairs, wherein the one or more selected DL/UL beam pairs are selected based at least in part on the uplink interference information.

21. The network entity of claim 14, wherein the uplink interference information indicates the final DL/UL beam pair and not the uplink interference measurement, and wherein the final DL/UL beam pair is selected based at least in part on the downlink signal to self-interference plus noise ratio and the uplink interference measurement, and wherein the one or more processors are configured to:
receive the downlink signal to self-interference plus noise ratio from the UE prior to transmitting the uplink interference information.

22. The network entity of claim 14, wherein the uplink interference information indicates the uplink interference measurement, and wherein the one or more processors are further configured to:
receive a measurement report indicating one or more selected DL/UL beam pairs based at least in part on the uplink interference information;
select the final DL/UL beam pair based at least in part on the uplink interference measurement;
transmit the uplink interference information indicating the final DL/UL beam pair; and communicate with the UE using the final DL/UL beam pair.

23. A method of wireless communication performed by a user equipment (UE), comprising:
performing, in a full duplex communication mode, a channel measurement (CM) associated with a self-interference measurement (SIM) to determine a downlink signal to self-interference plus noise ratio associated with a downlink (DL) and uplink (UL) (DL/UL) beam pair of the UE, the SIM performed in accordance with a reference signal corresponding to a cross link interference (CLI) measurement;
receiving, from a network entity, uplink interference information associated with a UL beam of the DL/UL beam pair of the UE, wherein the uplink interference information indicates at least one of:
an uplink interference measurement determined by the network entity,
or a final DL/UL beam pair selected by the network entity; and
transmitting a measurement report based at least in part on the CM and the SIM, wherein the measurement report is based at least in part on the downlink signal to self-interference plus noise ratio,
wherein, if the uplink interference information indicates the uplink interference measurement, the measurement report is based at least in part on the uplink interference measurement and the downlink signal to self-interference plus noise ratio, and
wherein, if the uplink interference information indicates the final DL/UL beam pair and not the uplink interference measurement, the uplink interference information is received after the measurement report is transmitted.

24. The method of claim 23, wherein the uplink interference information indicates the uplink interference measurement, wherein the uplink interference measurement indicates an interference level, and wherein the uplink interference information is received after the CM and the SIM are performed.

25. The method of claim 23, wherein the uplink interference measurement is based at least in part on a reference signal transmitted on an interference measurement resource by the UE as part of the SIM.

26. The method of claim 23, wherein the measurement report relates to one or more selected DL/UL beam pairs of the UE, and wherein the method further comprises:
selecting the one or more selected DL/UL beam pairs from a plurality of DL/UL beam pairs based at least in part on one or more selected CMs and SIMs associated with the one or more selected DL/UL beam pairs, wherein the one or more selected beam pairs are selected based at least in part on the one or more selected CMs and SIMs being associated with a best one or more values of a metric of respective CMs and SIMs of the plurality of DL/UL beam pairs.

27. A method of wireless communication performed by a network entity, comprising:
performing, for an uplink beam of a downlink and uplink (DL/UL) beam pair of a user equipment (UE) associated with a full duplex communication mode, an uplink interference measurement associated with a channel measurement (CM) and a self-interference measurement (SIM) of the UE, the SIM performed in accordance with a reference signal corresponding to a cross link interference (CLI) measurement; and
transmitting, to the UE, uplink interference information, wherein the uplink interference information indicates at least one of:
the uplink interference measurement, or
a final DL/UL beam pair selected by the network entity based at least in part on the uplink interference measurement and a downlink signal to self-interference plus noise ratio provided by the UE.

28. The method of claim 27, further comprising:
receiving a measurement report based at least in part on the CM and the SIM, wherein the measurement report is based at least in part on the CM and the SIM, and wherein, if the uplink interference information indicates the uplink interference measurement, the measurement report is based at least in part on the uplink interference measurement and the downlink signal to self-interference plus noise ratio.

29. The method of claim 27, wherein the uplink interference information indicates the uplink interference measurement, wherein the uplink interference measurement indicates an interference level, and wherein the uplink interference information is transmitted after the CM and the SIM are performed.

30. The method of claim 27, wherein the uplink interference information indicates the uplink interference measurement, and wherein the uplink interference measurement is transmitted before the CM and the SIM are performed.

* * * * *